United States Patent
Lindbo et al.

(10) Patent No.: US 11,939,157 B2
(45) Date of Patent: *Mar. 26, 2024

(54) ROBOTIC SERVICE DEVICE AND HANDLING METHOD

(71) Applicant: OCADO INNOVATION LIMITED, Hatfield (GB)

(72) Inventors: Lars Sverker Ture Lindbo, Harpenden (GB); Robert Rolf Stadie, Eversley (GB)

(73) Assignee: OCADO INNOVATION LIMITED, Hartfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,833

(22) Filed: Apr. 24, 2023

(65) Prior Publication Data

US 2023/0257195 A1   Aug. 17, 2023

Related U.S. Application Data

(60) Continuation of application No. 17/073,788, filed on Oct. 19, 2020, which is a continuation of application
(Continued)

(30) Foreign Application Priority Data

Aug. 9, 2013  (GB) ...................................... 1314313
Mar. 18, 2014  (GB) ...................................... 1404870

(51) Int. Cl.
*B65G 1/02* (2006.01)
*B25J 11/00* (2006.01)
(Continued)

(52) U.S. Cl.
CPC ............. *B65G 1/02* (2013.01); *B65G 1/0464* (2013.01); *B65G 1/0478* (2013.01);
(Continued)

(58) Field of Classification Search
CPC .......... B65G 1/02; B65G 1/04; B65G 1/0464; B65G 1/0478; B65G 1/0492; B65G 45/10;
(Continued)

(56) References Cited

U.S. PATENT DOCUMENTS 2,165,513 A    7/1939   Smith
2,701,065 A    2/1955   Bertel
(Continued)

FOREIGN PATENT DOCUMENTS

CH            640797        1/1984
CN          101139869       3/2008
(Continued)

OTHER PUBLICATIONS

"Brushless Pancake Motors," http://www.printedmotors.com/brushless-pancake-motors, dated Jul. 12, 2014, in 3 pages.
(Continued)

*Primary Examiner* — Saul Rodriguez
*Assistant Examiner* — Ashley K Romano
(74) *Attorney, Agent, or Firm* — Knobbe, Martens, Olson & Bear LLP

(57) ABSTRACT

A robotic service device is described for use on a robotic picking system grid. The robotic service device is capable of driving to any location on the grid order to perform maintenance operations or cleaning. Additionally, the service device may be used to rescue robotic load handling devices operational in the picking system. The robotic service device may include a releasable docking mechanism to enable it to dock and latch on to malfunctioning load handling devices. The service device may also be provided with cleaning capability and a camera to enable the condition of the grid and other robotic devices to be monitored.

28 Claims, 16 Drawing Sheets

Related U.S. Application Data

No. 15/127,308, filed as application No. PCT/EP2015/055695 on Mar. 18, 2015, now Pat. No. 10,836,577, application No. 18/305,833, filed on Apr. 24, 2023 is a continuation-in-part of application No. 18/303,520, filed on Apr. 19, 2023, now Pat. No. 11,858,738, which is a continuation of application No. 17/078,689, filed on Oct. 23, 2020, now Pat. No. 11,851,275, which is a continuation of application No. 16/902,459, filed on Jun. 16, 2020, now Pat. No. 10,913,602, which is a division of application No. 15/905,360, filed on Feb. 26, 2018, now Pat. No. 10,829,302, which is a continuation of application No. 14/910,858, filed as application No. PCT/GB2014/052273 on Jul. 24, 2014, now Pat. No. 10,000,337.

(51) Int. Cl.
   *B65G 1/04* (2006.01)
   *B65G 45/10* (2006.01)
   *B66C 5/04* (2006.01)
   *B66C 11/00* (2006.01)
   *B66F 9/075* (2006.01)

(52) U.S. Cl.
   CPC ........... *B65G 1/0492* (2013.01); *B65G 45/10* (2013.01); *B66C 5/04* (2013.01); *B66F 9/07504* (2013.01); *B25J 11/0085* (2013.01); *B65G 1/04* (2013.01); *B66C 11/00* (2013.01)

(58) Field of Classification Search
   CPC ..... B66F 9/07504; B25J 11/0085; B66C 5/04; B66C 11/00
   See application file for complete search history.

(56) References Cited

U.S. PATENT DOCUMENTS

| | | |
|---|---|---|
| 3,661,280 A | 5/1972 | Atwater |
| 3,703,243 A | 11/1972 | Monk |
| 3,800,963 A | 4/1974 | Holland |
| 4,088,232 A | 5/1978 | Lilly et al. |
| 4,470,742 A | 9/1984 | Schindler |
| 4,998,595 A | 3/1991 | Chen |
| 5,020,621 A | 6/1991 | Martin |
| 5,190,427 A | 3/1993 | Lai |
| 5,201,819 A | 4/1993 | Shiraishi et al. |
| 6,042,321 A | 3/2000 | Labell |
| 6,429,016 B1 | 8/2002 | McNeil |
| 6,572,319 B1 | 6/2003 | Simmons et al. |
| 6,654,662 B1 | 11/2003 | Hognaland |
| 6,885,911 B1 | 4/2005 | Smith |
| 7,032,763 B1 | 4/2006 | Zakula et al. |
| 7,381,022 B1 | 6/2008 | King |
| 7,441,999 B2 | 10/2008 | Nakao et al. |
| 7,686,176 B2 | 3/2010 | Murata |
| 7,912,574 B2 | 3/2011 | Wurman et al. |
| 8,628,289 B1 | 1/2014 | Benedict et al. |
| 8,758,178 B2 | 6/2014 | Gunji et al. |
| 9,002,506 B1 | 4/2015 | Agarwal et al. |
| 9,188,982 B2 | 11/2015 | Thomson |
| 9,422,108 B2 | 8/2016 | Hognaland |
| 9,466,046 B1 | 10/2016 | Theobald |
| 9,884,720 B2 * | 2/2018 | Van Den Berk ..... B65G 1/0492 |
| 9,886,036 B2 | 2/2018 | Douglas et al. |
| 10,018,397 B2 * | 7/2018 | Hognaland ........... F25D 25/04 |
| 10,294,025 B2 * | 5/2019 | Hognaland .......... B65G 1/0478 |
| 10,336,540 B2 * | 7/2019 | Gravelle .................. B65G 1/04 |
| 10,474,141 B2 | 11/2019 | Stadie et al. |
| 10,654,661 B2 | 5/2020 | Hognaland et al. |
| 10,781,043 B1 | 9/2020 | Kalm et al. |
| 10,836,577 B2 | 11/2020 | Fryer et al. |
| 11,161,690 B2 * | 11/2021 | Austrheim ........... B65G 1/0464 |
| 11,312,575 B2 * | 4/2022 | Austrheim ........... B65G 1/0464 |
| 11,358,846 B1 * | 6/2022 | Dwyer .................... B65G 47/34 |
| 11,360,465 B2 * | 6/2022 | Austrheim .............. B66F 9/063 |
| 2003/0229416 A1 | 12/2003 | Tai et al. |
| 2005/0191160 A1 | 9/2005 | Melin et al. |
| 2005/0220573 A1 | 10/2005 | Benedict et al. |
| 2005/0287038 A1 | 12/2005 | Dubrovsky et al. |
| 2006/0095160 A1 | 5/2006 | Orita et al. |
| 2008/0075566 A1 | 3/2008 | Benedict et al. |
| 2008/0075568 A1 | 3/2008 | Benedict et al. |
| 2008/0075569 A1 | 3/2008 | Benedict et al. |
| 2008/0133102 A1 | 6/2008 | Kubo |
| 2008/0281717 A1 | 11/2008 | Kortelainen |
| 2009/0074545 A1 | 3/2009 | Lert et al. |
| 2009/0222159 A1 | 9/2009 | Bauer |
| 2010/0316469 A1 | 12/2010 | Lert et al. |
| 2011/0027059 A1 | 2/2011 | Benedict et al. |
| 2011/0155487 A1 | 6/2011 | Nurmi et al. |
| 2011/0168465 A1 | 7/2011 | Starr |
| 2011/0243698 A1 | 10/2011 | Herold |
| 2012/0152877 A1 | 6/2012 | Tadayon |
| 2012/0195724 A1 | 8/2012 | Toebes et al. |
| 2012/0259482 A1 | 10/2012 | Klaus |
| 2012/0272500 A1 | 11/2012 | Reuteler et al. |
| 2014/0005933 A1 | 1/2014 | Fong et al. |
| 2014/0017046 A1 | 1/2014 | Wieschemann et al. |
| 2014/0086714 A1 | 3/2014 | Malik |
| 2015/0098775 A1 | 4/2015 | Razumov |
| 2015/0127143 A1 | 5/2015 | Lindbo et al. |
| 2016/0145058 A1 | 5/2016 | Lindbo |
| 2016/0194151 A1 | 7/2016 | Lindbo et al. |
| 2016/0347545 A1 | 12/2016 | Lindbo et al. |
| 2017/0129702 A1 | 5/2017 | Hognaland |
| 2017/0129703 A1 | 5/2017 | Lindbo et al. |
| 2017/0131720 A1 | 5/2017 | Sullivan et al. |
| 2017/0355524 A1 | 12/2017 | Hognaland |
| 2018/0050869 A1 | 2/2018 | Lindbo et al. |
| 2018/0086573 A1 | 3/2018 | Lindbo |
| 2018/0148259 A1 | 5/2018 | Gravelle et al. |
| 2018/0178980 A1 | 6/2018 | Lindbo et al. |
| 2018/0178981 A1 | 6/2018 | Lindbo et al. |
| 2018/0194571 A1 | 7/2018 | Fryer et al. |
| 2018/0319590 A1 | 11/2018 | Lindbo et al. |
| 2019/0009984 A1 | 1/2019 | Hognaland et al. |
| 2019/0031446 A1 | 1/2019 | Hognaland et al. |
| 2019/0225436 A1 | 7/2019 | Lindbo et al. |
| 2019/0232925 A1 | 8/2019 | Hognaland et al. |
| 2019/0300286 A1 | 10/2019 | Hognaland et al. |
| 2019/0322452 A1 | 10/2019 | Austrheim et al. |
| 2019/0375590 A1 | 12/2019 | Gravelle et al. |
| 2020/0002091 A1 | 1/2020 | Shields et al. |
| 2020/0087065 A1 | 3/2020 | Gravelle et al. |
| 2020/0148470 A1 | 5/2020 | Austrheim |
| 2020/0207546 A1 | 7/2020 | Borders et al. |
| 2020/0216263 A1 | 7/2020 | Fjeldheim et al. |
| 2020/0223633 A1 | 7/2020 | Stadie et al. |
| 2020/0290803 A1 | 9/2020 | Austrheim |
| 2020/0290804 A1 | 9/2020 | Fjeldheim et al. |
| 2020/0324971 A1 | 10/2020 | Ingram-Tedd et al. |
| 2020/0339348 A1 | 10/2020 | Durai |
| 2020/0363819 A1 | 11/2020 | Stadie et al. |
| 2020/0399060 A1 | 12/2020 | Whelan et al. |
| 2021/0032026 A1 | 2/2021 | Lindbo et al. |
| 2021/0101743 A1 | 4/2021 | Fryer et al. |
| 2021/0339950 A1 | 11/2021 | Austrheim |
| 2021/0387808 A1 | 12/2021 | Kalouche |
| 2023/0192404 A1 | 6/2023 | Sharp et al. |
| 2023/0194140 A1 | 6/2023 | Meuth et al. |

FOREIGN PATENT DOCUMENTS

| | | |
|---|---|---|
| CN | 101276773 | 10/2008 |
| CN | 201882525 | 6/2011 |
| CN | 103101737 | 5/2013 |
| CN | 103171851 | 6/2013 |
| CN | 103287776 | 9/2013 |
| CN | 103612882 | 3/2014 |
| DE | 4203823 | 8/1993 |

(56) References Cited

FOREIGN PATENT DOCUMENTS

| | | |
|---|---|---|
| DE | 19849391 | 5/2000 |
| DE | 19935742 | 2/2001 |
| DE | 102009050585 | 10/2009 |
| DE | 102009017241 | 10/2010 |
| DE | 202009014456 | 3/2011 |
| EP | 0034154 | 8/1981 |
| EP | 0767113 | 4/1997 |
| EP | 1037828 | 9/2000 |
| EP | 2020388 | 2/2009 |
| EP | 2308778 | 4/2011 |
| EP | 2450296 | 5/2012 |
| EP | 2548822 | 12/2014 |
| EP | 3050824 | 10/2019 |
| FR | 2710330 | 3/1995 |
| FR | 2730715 | 8/1996 |
| GB | 2514930 | 12/2014 |
| GB | 2518259 | 3/2015 |
| GB | 2520104 | 5/2015 |
| JP | S49-83778 U | 7/1974 |
| JP | S51-061917 | 5/1976 |
| JP | 56-134917 U | 10/1981 |
| JP | 56-134918 U | 10/1981 |
| JP | S59-7605 A | 1/1984 |
| JP | H02-095605 | 4/1990 |
| JP | 03-117417 | 5/1991 |
| JP | H3-139144 A | 6/1991 |
| JP | H0490957 | 3/1992 |
| JP | 05-054412 U | 7/1993 |
| JP | H06263329 | 9/1994 |
| JP | H10203647 | 8/1998 |
| JP | H10250978 | 9/1998 |
| JP | H10299280 | 11/1998 |
| JP | H11278607 | 10/1999 |
| JP | 2002202816 | 7/2002 |
| JP | 2004269152 | 9/2004 |
| JP | 2005206371 | 8/2005 |
| JP | 2008-140144 | 6/2008 |
| NO | 317366 | 10/2004 |
| NO | 20121488 | 6/2014 |
| NO | 20140773 | 12/2015 |
| WO | WO 98/049075 | 11/1998 |
| WO | WO2002/000542 | 1/2002 |
| WO | WO2005/077789 | 8/2005 |
| WO | WO2006/002385 | 1/2006 |
| WO | WO2006/095047 | 9/2006 |
| WO | WO2007/007354 | 1/2007 |
| WO | WO2007/043129 | 4/2007 |
| WO | WO2008/061951 | 5/2008 |
| WO | WO2013/167907 | 11/2013 |
| WO | WO2014/090684 | 6/2014 |
| WO | WO2014/195901 | 12/2014 |
| WO | WO2014/195902 | 12/2014 |
| WO | WO2014/203126 | 12/2014 |
| WO | WO 2015/019055 | 2/2015 |
| WO | WO2015/127828 | 9/2015 |
| WO | WO2015/140216 | 9/2015 |
| WO | WO2015/193278 | 12/2015 |

OTHER PUBLICATIONS

"Protean Electric's Gearless, Direct-Drive System: An In-Wheel Motor Concept," TechieTonics, http://www.techietonics.com/futuretech-tonics/protean-electrics-gearless-direct-drive-system-an-in-wheel-motor-concept.html, posted by Pooja Kashyap, dated Mar. 21, 2014, in 4 pages.
Autostore Logistic—Technical Presentation, HattelandSolutions, Youtube, dated Aug. 26, 2009, in 1 page.
Christensen, "Designing In-Hub Brushless Motors," dated Jul. 22, 2014, in 5 pages.
Examining Division Remarks on Relevance of Third-Party Observation of May 22, 2020 for European Patent Application No. 19178591.4, filed Jun. 8, 2020, in 1 page.
Examining Division Remarks on Relevance of Third-Party Observation of Jun. 24, 2020, for European Patent Application No. 19178591.4, filed Jul. 23, 2020, in 2 pages.
First Opposition to European Patent No. 3030504, dated Nov. 5, 2018, in 61 pages.
First Opposition to European Patent No. 3293129, dated Aug. 24, 2020, in 63 pages.
First Opposition to European Patent No. 3299316, dated Jul. 6, 2020, in 59 pages.
First Set of Third Party Observations for European Patent Application No. 19178591.4, dated Jun. 24, 2020, in 4 pages.
International Search Report (PCT/ISA/210) dated Jan. 15, 2015, by the European Patent Office as the International Searching Authority for International Application No. PCT/GB2014/052273.
Opponent Observations in Opposition to European Patent No. 3030504, dated Apr. 4, 2020, in 13 pages.
Patent Owner Observations in Oppositions against European Patent No. 3030504, dated Apr. 3, 2020, in 51 pages.
Patent Owner Reply to Opponent Observations in Oppositions to European Patent No. 3030504, dated Jun. 1, 2020, in 98 pages.
PCT Third Party Observations for PCT Application PCT/GB2014/052273, filed Jun. 4, 2015, in 26 pages.
Preliminary Opinion of Opposition Division in Oppositions to European Patent No. 3030504, dated Oct. 10, 2019, in 12 pages.
Reply to Oppositions to European Patent No. 3030504, dated Mar. 26-27, 2019, in 60 pages.
Reply to Oppositions to European Patent No. 3293129, dated Apr. 26, 2021, in 68 pages.
Reply to Third Party Observations for European Patent Application No. 19178591.4, dated Jul. 2, 2020, in 2 pages.
Response to EPC 94/3 and first Third Party Observation for Application No. EP20190178591, 2 pages (Jan. 30, 2020).
Second Opposition to European Patent No. 3030504, dated Nov. 7, 2018, in 19 pages.
Second Opposition to European Patent No. 3293129, dated Aug. 27, 2020, in 21 pages.
Second Opposition to European Patent No. 3299316, dated Jul. 9, 2020, in 27 pages.
Second Set of Third Party Observations for European Patent Application No. 19178591.4, dated Jun. 24, 2020, in 3 pages.
Third Party Observation for Application No. EP20190178591, 6 pages (May 22, 2020).
Third Party Observation for Application No. EP20190178591, 6 pages (Nov. 27, 2019).
U.K. Patent Application No. GB1310784.2, filed Jun. 17, 2013, in 31 pages.
U.K. Patent Application No. GB1404870.6, filed Mar. 18, 2014, in 37 pages.
United Kingdom Search Report dated Feb. 10, 2015.
Written Opinion (PCT/ISA/237) dated Jan. 15, 2015, by the European Patent Office as the International Searching Authority for International Application No. PCT/GB2014/052273.
Wulfraat, "Swisslog Autostore: An In-Depth Review of Automated Split Case Picking Technology for Distribution Centers," Jun. 2012, in 27 pages.
Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Jan. 17, 2021, in 570 pages (two uploads).
Written Statement of Dr. Sheikh Shakeel Ahmad about Drawings for PCT/GB2014/052273, dated Dec. 3, 2020, in 23 pages.
First Opponent Remarks in Advance of Oral Proceedings in Opposition to European Patent No. 3030504, dated Nov. 18, 2020, in 22 pages.
Second Opponent Remarks in Advance of Oral Proceedings in Opposition to European Patent No. 3030504, dated Nov. 20, 2020, in 5 pages.
Patent Owner Remarks in Advance of Oral Proceedings in Opposition to European Patent No. 3030504, dated Jan. 14, 2021, in 65 pages.
Results of Oral Proceedings in Opposition to European Patent No. 3030504, dated Jan. 21, 2021, in 6 pages.
Minutes of Oral Proceedings in Opposition to European Patent No. 3030504, dated May 10, 2021, in 6 pages.

(56) References Cited

OTHER PUBLICATIONS

Interlocutory Decision in Opposition to European Patent No. 3030504, dated May 10, 2021, in 34 pages.
Reply to Oppositions to European Patent No. 3299316, dated Dec. 9, 2020, in 74 pages.
Opposition to European Patent No. 3556689, dated Nov. 19, 2020, in 30 pages.
Patent Owner Statement of Grounds of Appeal from Interlocutory Decision in Opposition to European Patent No. 3030504, dated Sep. 20, 2021, in 6 pages.
Opponent Grounds of Appeal from Interlocutory Decision in Opposition to European Patent No. 3030504, dated Sep. 20, 2021, in 36 pages.
Response by Patent Owner to Grounds of Appeal by Opponent from Interlocutory Decision in Opposition to European Patent No. 3030504, dated Feb. 4, 2022, in 26 pages.
Response by Opponent to Patent Owner Grounds of Appeal from Interlocutory Decision in Opposition to European Patent No. 3030504, dated Feb. 4, 2022, in 3 pages.
Boards of Appeal Summons to Oral Proceedings and Introductory Remarks and Preliminary Conclusionin Appeal from Interlocutory Decision in Opposition to European Patent No. 3030504, dated May 6, 2022, in 22 pages.
Comments on Preliminary Opinion by Opponent in Preparation for Oral Proceedings in Appeal fromInterlocutory Decision in Opposition to European Patent No. 3030504, dated Dec. 21, 2022, in 8 pages.
Minutes of Oral Proceedings in Appeal from Interlocutory Decision in Opposition to European Patent No. 3030504, dated Jan. 31, 2023, in 7 pages.
Preliminary Opinion of Opposition Division in Oppositions to European Patent No. 3299316, dated Feb. 17, 2022, in 27 pages.
Patent Owner Observations on Preliminary Opinion and Additional Auxilary Requests in Oppositions to European Patent No. 3299316, dated Sep. 8, 2022, in 22 pages.
Opponent Observations on Preliminary Opinion in Oppositions to European Patent No. 3299316, dated Sep. 9, 2022, in 6 pages.
Opponent Submissions in Advance of Oral Proceedings in Oppositions to European Patent No. 3299316, dated Nov. 1, 2022, in 4 pages.
Board Decision and Minutes of Oral Proceedings in Oppositions to European Patent No. 3299316, dated Dec. 23, 2022, in 32 pages.
Preliminary Opinion of Opposition Division in Oppositions to European Patent No. 3293129, dated Feb. 17, 2022, in 25 pages.
Patent Owner Observations on Preliminary Opinion and Additional Auxilary Requests in Oppositions to European Patent No. 3293129, dated Sep. 8, 2022, in 12 pages.
Opponent Observations on Preliminary Opinion in Oppositions to European Patent No. 3293129, dated Sep. 9, 2022, in 6 pages.
Patent Owner Reply to Objections and Additional Auxilary Requests in Oppositions to European Patent No. 3293129, dated Oct. 31, 2022, in 10 pages.
Opponent Submissions in Advance of Oral Proceedings in Oppositions to European Patent No. 3293129, dated Nov. 1, 2022, in 5 pages.
Board Decision and Minutes of Oral Proceedings in Oppositions to European Patent No. 3293129, dated Feb. 10, 2023, in 39 pages.
Additional Arguments in Opposition to European Patent No. 3556689, dated Jun. 9, 2021, in 6 pages.
Patent Owner Response to Opposition to European Patent No. 3556689, dated Nov. 3, 2021, in 147 pages.
Preliminary Opinion of Opposition Division in Opposition to European Patent No. 3556689, dated Apr. 25, 2022, in 28 pages.
Opponent Submissions in Advance of Oral Proceedings in Opposition to European Patent No. 3556689, dated Jan. 20, 2023, in 11 pages.
Patent Owner Request to Revoke European Patent No. 3556689, dated Jan. 20, 2023, in 1 page.
Third Party Observations for European Publication No. 3795501, dated May 11, 2021, in 3 pages.
Patent Owner Reply to Communication from Examining Division and Third Party Observations for European Publication No. 3795501, dated May 21, 2021, in 3 pages.
Third Party Objections for European Publication No. 3795501, dated Jul. 14, 2021, in 4 pages.
AutoStore Request to Stay Proceeding in view of Instituted Entitlement Proceedings in UK for European Publication No. 3795501, dated Jul. 16, 2021, in 59 pages.
Patent Owner Reply to AutoStore Request to Stay Proceeding in view of Instituted Entitlement Proceedings in UK for European Publication No. 3795501, dated Jul. 21, 2021, in 7 pages.
Stay of Proceeding Pursuant to Rule 14(1) EPC for European Publication No. 3795501, dated Jul. 22, 2021, in 3 pages.
Patent Owner Response to Stay of Proceeding Pursuant to Rule 14(1) EPC for European Publication No. 3795501, dated Aug. 2, 2021, in 308 pages.
Communication Concerning Stay and Resumption of Proceedings Pursuant to Rule 14(1) EPC for European Publication No. 3795501, dated Aug. 11, 2021, in 5 pages.
Request for Resumption of Grant Proceedings for European Publication No. 3795501, dated Nov. 10, 2021, in 4 pages.
Communication Confirming Withdrawl of Entitlement Action in UK for European Publication No. 3795501, dated Nov. 19, 2021, in 4 pages.
Resumption of Grant Proceedings Under Rule 14 EPC for European Publication No. 3795501, dated Nov. 24, 2021, in 3 pages.
First Opposition to European Patent No. 3795501, dated Feb. 16, 2022, in 6 pages.
Second Opposition to European Patent No. 3795501, dated Nov. 16, 2022, in 36 pages.
Additional Annex for Second Opposition to European Patent No. 3795501, dated Feb. 1, 2023, in 4 pages.
Decision of Technical Board of Appeal in Appeal to Oppositions to European Patent No. 3030504, dated Jan. 26, 2023, in 28 pages.
Third Party Observations for European Patent No. 4101791, dated Dec. 15, 2022, in 5 pages.
Opposition to European Patent No. 4101791, dated Jan. 18, 2023, in 18 pages.
Martini, "Systemvergleich Innovativer Konzepte der Automatischen Kleinteillagerung", Universität Siegen, dated Jul. 2011, in 232 pages.
Opposition to European Patent No. 3967629, dated Feb. 18, 2023, in 31 pages.
Response by Patentee to Oppositions of European Patent No. 3795501, dated Apr. 11, 2023, in 131 pages.
Amended Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Feb. 16, 2021, in 585 pages (two uploads).
Defendant's Motion to Dismiss with Memorandum of Law in Support of Motion and Exhibits, *Ocado Innovation Ltd. and Ocado Solutions Ltd.* vs. *Autostore AS and Autostore Systems, Inc.*, Case No. 1:21-cv-00041-JL, filed Mar. 22, 2021, in 121 pages.
Second Amended Complaint for Patent Infringement with Exhibits, *Ocado Innovation Ltd. and Ocado Solutions Ltd.* vs. *Autostore AS and Autostore System Inc.*, Case No. 1:21-cv-00041-JL, filed Apr. 23, 2021, in 790 pages (two uploads).
Defendant's Partially Renewed Motion to Dismiss with Memorandum of Law in Support of Partially Renewed Motion and Exhibits, *Ocado Innovation Ltd. and Ocado Solutions Ltd.* vs. *Autostore AS and Autostore Systems, Inc.*, Case No. 1:21-cv-00041-JL, filed May 7, 2021, in 111 pages.
Plaintiffs' Opposition to Defendant's Partially Renewed Motion to Dismiss, *Ocado Innovation Ltd. And Ocado Solutions Ltd.* vs. *Autostore AS and Autostore Systems, Inc.*, Case No. 1:21-cv-00041-JL, filed May 21, 2021, in 37 pages.
Jacobs, Theo et al., "Design of wheel modules for non-holonomic, omnidirectional mobile robots in context of the emerging control problems", Robotik 2012, pp. 135-138.
Defendant's Reply in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed May 28, 2021, in 18 pages.

(56) References Cited

OTHER PUBLICATIONS

Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 22, 2021, in 21 pages.
Plaintiff's Notice of Supplemental Authority in Opposition to Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jun. 23, 2021, in 38 pages.
Defendant's Notice of Supplemental Authority in Support of Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Jul. 29, 2021, in 15 pages.
"An Introduction to the AutoStore System," AutoStore Concept Ver. 01.10a Commercial, dated 2004, in 36 pages.
Bräunl, "Embedded Robotics"—Mobile Robot Design and Applications with Embedded Systems, pp. 1-13 and 104, published 2006, in 14 pages.
Borenstein et al., "Where am I? Sensors and Methods for Mobile Robotic Positioning," University of Michigan, pp. 1-11 and 180-181, dated 1996, in 13 pages.
Gawrilow et al., "Dynamic Routing of Automated Guided Vehicles in Real-time," Technische Universität Berlin, Fakultät Mathematik und Naturwissenschaften, Institut für Mathematik, No. 039/2007, dated Oct. 10, 2007, in 16 pages.
Vivaldini et al., "Robotic Forklifts for Intelligent Warehouses: Routing, Path Planning, and Auto-localization," IEEE, dated 2010, in 6 pages.
Vivaldini et al., "Automatic Routing System for Intelligent Warehouses," IEEE, dated Feb. 28, 2010, in 6 pages.
Memorandum Order Denying Defendant's Partially Renewed Motion to Dismiss, *Ocado Innovation Ltd. and Ocado Solutions Ltd.* vs. *Autostore AS and Autostore Systems, Inc.*, Case No. 1:21-cv-00041-JL, filed Aug. 13, 2021, in 38 pages.
Defendant's Answer, Affirmative Defenses, and Counterclaims to Plaintiff's Second Amended Complaint, *Ocado Innovation Ltd. and Ocado Solutions Ltd.* vs. *Autostore AS and Autostore Systems, Inc.*, Case No. 1:21-cv-00041-JL, filed Aug. 27, 2021, in 49 pages.
Plaintiff's Answer to Defendant's Counterclaims, *Ocado Innovation Ltd. and Ocado Solutions Ltd.* vs. *Autostore AS and Autostore Systems, Inc.*, Case No. 1:21-cv-00041-JL, filed Oct. 1, 2021, in 9 pages.
Plaintiff's Motion to Strike Defendant's Affirmative Defense of Inequitable Conduct and Memorandum in Support of Motion, *Ocado Innovation Ltd. and Ocado Solutions Ltd.* vs. *Autostore AS and Autostore Systems, Inc.*, Case No. 1:21-cv-00041-JL, filed Oct. 1, 2021, in 48 pages.
Complaint for Patent Infringement with Exhibits, *Ocado Innovation Ltd. and Ocado Solutions Ltd.* vs. *Autostore AS and Autostore System Inc.*, Case No. 1:21-cv-00806-JL, filed Oct. 6, 2021, in 438 pages.
Plaintiff's Reply Memorandum in Further Support of Motion to Strike Defendant's Affirmative Defense ofIInequitable Conduct, *Ocado Innovation Ltd. and Ocado Solutions Ltd.* vs. *Autostore AS and Autostore Systems, Inc.*, Case No. 1:21-cv-00041-JL, filed Oct. 22, 2021, in 14 pages.
Corrected Order of Consolidation Consolidating Case No. 1:21-cv-00041-JL and 1:21-cv-00806-JL, *Ocado Innovation Ltd. and Ocado Solutions Ltd.* vs. *Autostore AS and Autostore Systems, Inc.*, filed Dec. 8, 2021, in 2 pages.
Defendant's Answer, Affirmative Defenses, and Counterclaims to Plaintiff's Complaint in Former Case No. 1:21-cv-00806-JL, *Ocado Innovation Ltd. and Ocado Solutions Ltd.* vs. *Autostore AS and Autostore Systems, Inc.*, Case No. 1:21-cv-00041-JL, filed Dec. 10, 2021, in 36 pages.
Memorandum Order Granting Plaintiff's Motion to Strike Defendant's Inequitable Conduct Defense, *Ocado Innovation Ltd. and Ocado Solutions Ltd.* vs. *Autostore AS and Autostore Systems, Inc.*, Case No. 1:21-cv-00041-JL, filed Dec. 30, 2021, in 13 pages.
Plaintiff's Answer to Defendant's Counterclaims in Former Case No. 1:21-cv-00806-JL, *Ocado Innovation Ltd. and Ocado Solutions Ltd.* vs. *Autostore AS and Autostore Systems, Inc.*, Case No. 1:21-cv-00041-JL, filed Dec. 31, 2021, in 6 pages.
Defendant's Opposition to Plaintiff's Motion to Strike, *Ocado Innovation Ltd. and Ocado Solutions Ltd.* vs. *Autostore AS and Autostore Systems, Inc.*, Case No. 1:21-cv-00041-JL, filed Jun. 7, 2022, in 19 pages.
Plaintiff's Reply Memorandum in Further Support of Motion to Strike Defendant's Untimely ProposedClaim Constructions, *Ocado Innovation Ltd. and Ocado Solutions Ltd.* vs. *Autostore AS and Autostore Systems, Inc.*, Case No. 1:21-cv-00041-JL, filed Jun. 13, 2022, in 6 pages.
Defendant's Sur-Reply in Opposition to Plaintiff's Motion to Strike, *Ocado Innovation Ltd. and OcadoSolutions Ltd.* vs. *Autostore AS and Autostore Systems, Inc.*, Case No. 1:21-cv-00041-JL, filed Jun. 14, 2022, in 9 pages.
Defendant's Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 1, 2022, in 5 pages.
Plaintiff's Opposition to Defendant's Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 7, 2022, in 12 pages.
Defendant's Reply in Support of Motion to Partially Strike Plaintiff's First Supplemental Preliminary Infringement Contentions, *Ocado Innovation Ltd. and Ocado Solutions Ltd.* vs. *Autostore AS and Autostore Systems, Inc.*, Case No. 1:21-cv-00041-JL, filed Jun. 10, 2022, in 9 pages.
Joint Claim Construction and Prehearing Statement, *Ocado Innovation Ltd. and Ocado Solutions Ltd.* vs. *Autostore AS and Autostore Systems, Inc.*, Case No. 1:21-cv-00041-JL, filed Jun. 3, 2022, in 80 pages.
Defendant's SPR 6.1 (a) Disclosure of Claim Terms Proposed for Construction, *Ocado Innovation Ltd. and Ocado Solutions Ltd.* vs. *Autostore AS and Autostore Systems, Inc.*, Case No. 1:21-cv-00041-JL, dated Mar. 24, 2022, in 8 pages.
Plaintiff's Proposed Claim Constructions and Supporting Evidence, *Ocado Innovation Ltd. and OcadoSolutions Ltd.* vs. *Autostore AS and Autostore Systems, Inc.*, Case No. 1:21-cv-00041-JL, dated Apr. 21, 2022, in 28 pages.
Plaintiff's Supplemental Proposed Claim Constructions and Supporting Evidence, *Ocado Innovation Ltd. and Ocado Solutions Ltd.* vs. *Autostore AS and Autostore Systems, Inc.*, Case No. 1:21-cv-00041-JL, dated May 13, 2022, in 29 pages.
Declaration of Dr. Brian Pfeifer in Support of Plaintiff's Proposed Claim Constructions, *Ocado Innovation Ltd. and Ocado Solutions Ltd.* vs. *Autostore AS and Autostore Systems, Inc.*, Case No. 1:21-cv-00041-JL, dated May 27, 2022, in 35 pages.
Declaration of Dr. Petros Ioannou in Support of Defendant's Proposed Claim Constructions, *Ocado Innovation Ltd. and Ocado Solutions Ltd.* vs. *Autostore AS and Autostore Systems, Inc.*, Case No. 1:21-cv-00041-JL, dated May 27, 2022, in 78 pages.
Declaration of Dr. Raffaello D'Andrea in Support of Plaintiff's Proposed Claim Constructions, *Ocado Innovation Ltd. and Ocado Solutions Ltd.* vs. *Autostore AS and Autostore Systems, Inc.*, Case No. 1:21-cv-00041-JL, dated May 27, 2022, in 64 pages.
Declaration of Dr. Matthew Spenko in Support of Defendant's Proposed Claim Constructions, *Ocado Innovation Ltd. and Ocado Solutions Ltd.* vs. *Autostore AS and Autostore Systems, Inc.*, Case No. 1:21-cv-00041-JL, dated May 27, 2022, in 22 pages.
Plaintiff's Updated Supplemental Proposed Claim Constructions and Supporting Evidence, *Ocado Innovation Ltd. and Ocado Solutions Ltd.* vs. *Autostore AS and Autostore Systems, Inc.*, Case No. 1:21-cv-00041-JL, dated May 27, 2022, in 36 pages.
Rebuttal Declaration of Dr. Stephen Derby Regarding Claim Construction, *Ocado Innovation Ltd. and Ocado Solutions Ltd.* vs. *Autostore AS and Autostore Systems, Inc.*, Case No. 1:21-cv-00041-JL, dated Jun. 24, 2022, in 38 pages.
Rebuttal Declaration of Dr. Petros Ioannou Regarding Claim Construction, *Ocado Innovation Ltd. and Ocado Solutions Ltd.* vs.

(56) References Cited

OTHER PUBLICATIONS

*Autostore AS and Autostore Systems, Inc.*, Case No. 1:21-cv-00041-JL, dated Jun. 24, 2022, in 135 pages.
Rebuttal Declaration of Dr. Brian Pfeifer Regarding Claim Construction, *Ocado Innovation Ltd. and Ocado Solutions Ltd.* vs. *Autostore AS and Autostore Systems, Inc.*, Case No. 1:21-cv-00041-JL, dated Jun. 24, 2022, in 15 pages.
Rebuttal Declaration of Dr. Raffaello D'Andrea Regarding Claim Construction, *Ocado Innovation Ltd. and Ocado Solutions Ltd.* vs. *Autostore AS and Autostore Systems, Inc.*, Case No. 1:21-cv-00041-JL, dated Jun. 24, 2022, in 41 pages.
Rebuttal Declaration of Dr. Matthew Spenko Regarding Claim Construction, *Ocado Innovation Ltd. and Ocado Solutions Ltd.* vs. *Autostore AS and Autostore Systems, Inc.*, Case No. 1:21-cv-00041-JL, dated Jun. 24, 2022, in 6 pages.
Plaintiff's Opening Claim Construction Brief, *Ocado Innovation Ltd. and Ocado Solutions Ltd.* vs. *Autostore AS and Autostore Systems, Inc.*, Case No. 1:21-cv-00041-JL, dated Aug. 1, 2022, in 69 pages.
Defendant's Opening Claim Construction Brief, *Ocado Innovation Ltd. and Ocado Solutions Ltd.* vs. *Autostore AS and Autostore Systems, Inc.*, Case No. 1:21-cv-00041-JL, dated Aug. 1, 2022, in 65 pages.
Amended Joint Claim Construction and Prehearing Statement, *Ocado Innovation Ltd. and Ocado Solutions Ltd.* vs. *Autostore AS and Autostore Systems, Inc.*, Case No. 1:21-cv-00041-JL, dated Aug. 5, 2022, in 51 pages.
Defendant's Reply Claim Construction Brief, *Ocado Innovation Ltd. and Ocado Solutions Ltd.* vs. *Autostore AS and Autostore Systems, Inc.*, Case No. 1:21-cv-00041-JL, dated Aug. 22, 2022, in 66 pages.
Plaintiff's Responsive Claim Construction Brief, *Ocado Innovation Ltd. and Ocado Solutions Ltd.* vs. *Autostore AS and Autostore Systems, Inc.*, Case No. 1:21-cv-00041-JL, dated Aug. 22, 2022, in 64 pages.
Transcript of Markman Hearing—Morning Session, *Ocado Innovation Ltd. and Ocado Solutions Ltd.* vs. *Autostore AS and Autostore Systems, Inc.*, Case No. 1:21-cv-00041-JL, dated Sep. 29, 2022, in 115 pages.
Transcript of Markman Hearing—Afternoon Session, *Ocado Innovation Ltd. and Ocado Solutions Ltd.* vs. *Autostore AS and Autostore Systems, Inc.*, Case No. 1:21-cv-00041-JL, dated Sep. 29, 2022, in 130 pages.
Assented-To Motion for Leave to File Supplemental Responses to Certain of the Court's Markman Hearing Questions and Plaintiff's Proposed Supplemental Responses, *Ocado Innovation Ltd. and Ocado Solutions Ltd.* vs. *Autostore AS and Autostore Systems, Inc.*, Case No. 1:21-cv-00041-JL, dated Oct. 12, 2022, in 25 pages.
Defendant's Response to Plaintiff's Supplemental Responses to Certain of the Court's MarkmanHearing Questions, *Ocado Innovation Ltd. and Ocado Solutions Ltd.* vs. *Autostore AS and Autostore Systems, Inc.*, Case No. 1:21-cv-00041-JL, dated Oct. 20, 2022, in 31 pages.
Declaration of Boloori in Support of Defendant's Opposition to Plaintiff's Motion to Strike with Chart Summarizing Certain Plaintiff Statements in Claim Construction Briefing and Motion to Strike, *Ocado Innovation Ltd. and Ocado Solutions Ltd.* vs. *Autostore AS and Autostore Systems, Inc.*, Case No. 1:21-cv-00041-JL, dated Dec. 9, 2022, in 15 pages.
Plaintiff's Supplemental Claim Construction Brief, *Ocado Innovation Ltd. and Ocado Solutions Ltd.* vs. *Autostore AS and Autostore Systems, Inc.*, Case No. 1:21-cv-00041-JL, dated Jan. 5, 2023, in 6 pages.
Defendant's Supplemental Brief in Response to Plaintiff's Supplemental Claim Construction Brief, *Ocado Innovation Ltd. and Ocado Solutions Ltd.* vs. *Autostore AS and Autostore Systems, Inc.*, Case No. 1:21-cv-00041-JL, dated Jan. 10, 2023, in 9 pages.
Defendant's Notice of Supplemental Authority, *Ocado Innovation Ltd. and Ocado Solutions Ltd.* vs. *Autostore AS and Autostore Systems, Inc.*, Case No. 1:21-cv-00041-JL, dated Feb. 2, 2023, in 97 pages.
Petition for Inter Partes Review of U.S. Pat. No. 10,913,602, *Autostore System Inc.* v. *Ocado Innovation Limited*, Inter Partes Review No. IPR2022-00443, dated Jan. 14, 2022, in 97 pages.
Ex. 1003 Declaration of Dr. Stephen Derby, *Autostore System Inc.* v. *Ocado Innovation Limited*, Inter Partes Review No. IPR2022-00443, dated Jan. 14, 2022, in 95 pages.
Ex. 1007 Petition for Inter Partes Review of U.S. Pat. No. 10,474,140, *Autostore System Inc.* v. *Ocado Innovation Limited*, Inter Partes Review No. IPR2022-00443, dated Jan. 14, 2022, in 92 pages.
Ex. 1008 Corrected Declaration of Dr. Brian Pfeifer in Support of Petition for Inter Partes Review of U.S. Pat. No. 10,474,140, *Autostore System Inc.* v. *Ocado Innovation Limited*, Inter Partes Review No. IPR2022-00443, dated Jan. 14, 2022, in 126 pages.
Ex. 1010 Corrected Declaration of Dr. Brian Pfeifer in Support of Petition for Inter Partes Review of U.S. Pat. No. 10,474,140, *Autostore System Inc.* v. *Ocado Innovation Limited*, Inter Partes Review No. IPR2022-00443, dated Jan. 14, 2022, in 126 pages.
Ex. 1012 Decision Denying Institution of Inter Partes Review of U.S. Pat. No. 10,494,239, *AutostoreSystem Inc.* v. *Ocado Innovation Limited*, Inter Partes Review No. IPR2022-00443, filed Jan. 14, 2022, in 41 pages.
Ex. 1013 Decision Denying Institution of Post-Grant Review of U.S. Pat. No. 10,696,478, *AutostoreSystem Inc.* v. *Ocado Innovation Limited*, Inter Partes Review No. IPR2022-00443, dated Jan. 14, 2022, in 36 pages.
Ex. 1014 Declaration of Dr. Bruno Lequesne, *Autostore System Inc.* v. *Ocado Innovation Limited*, Inter Partes Review No. IPR2022-00443, dated Jan. 14, 2022, in 21 pages.
Ex. 1015 Letter from Proceeding Relating to EP3050824, *Autostore System Inc.* v. *Ocado Innovation Limited*, Inter Partes Review No. IPR2022-00443, dated Jan. 14, 2022, in 97 pages.
Ex. 1016 Notice of Opposition to EP3050824, *Autostore System Inc.* v. *Ocado Innovation Limited*, Inter Partes Review No. IPR2022-00443, dated Jan. 14, 2022, in 50 pages.
Patent Owner Preliminary Response in Reply to Petition for Inter Partes Review of U.S. Pat. No. 10,913,602, *Autostore System Inc.* v. *Ocado Innovation Limited*, Inter Partes Review No. IPR2022-00443, dated Apr. 25, 2022, in 86 pages.
Ex. 2009 Patent Owner Preliminary Response in Reply to Petition for Inter Partes Review for U.S. Pat. No. 10,093,525, *Autostore System Inc.* v. *Ocado Innovation Limited*, Inter Partes Review No. IPR2022-00443, dated Apr. 25, 2022, in 80 pages.
Ex. 2010 Patent Owner Preliminary Response in Reply to Petition for Inter Partes Review for U.S. Pat. No. 10,494,239, *Autostore System Inc.* v. *Ocado Innovation Limited*, Inter Partes Review No. IPR2022-00443, dated Apr. 25, 2022, in 81 pages.
Ex. 2011 Patent Owner Preliminary Response in Reply to Petition for Post-Grant Review for U.S. Pat. No. 10,696,478, *Autostore System Inc.* v. *Ocado Innovation Limited*, Inter Partes Review No. IPR2022-00443, dated Apr. 25, 2022, in 83 pages.
Ex. 2012 ITC Final Initial Determination (public version) in Inv. No. 337-TA-1228, *Autostore System Inc.* v. *Ocado Innovation Limited*, Inter Partes Review No. IPR2022-00443, dated Apr. 25, 2022, in 180 pages (in 2 parts).
Ex. 2014 Reply to Notice of Opposition to EP3250481, *Autostore System Inc.* v. *Ocado Innovation Limited*, Inter Partes Review No. IPR2022-00443, dated Apr. 25, 2022, in 29 pages.
Ex. 2015 Notice of Opposition to EP3250481, *Autostore System Inc.* v. *Ocado Innovation Limited*, Inter Partes Review No. IPR2022-00443, dated Apr. 25, 2022, in 6 pages.
Ex. 2016 Reply to Notice of Opposition to EP3050824, *Autostore System Inc.* v. *Ocado Innovation Limited*, Inter Partes Review No. IPR2022-00443, dated Apr. 25, 2022, in 31 pages.
Ex. 2017 Notice of Opposition to EP3050824, *Autostore System Inc.* v. *Ocado Innovation Limited*, Inter Partes Review No. IPR2022-00443, dated Apr. 25, 2022, in 8 pages.

(56) References Cited

OTHER PUBLICATIONS

Ex. 2018 ITC Commission Opinion (public version) in Inv. No. 337-TA-1228, *Autostore System Inc. v. Ocado Innovation Limited*, Inter Partes Review No. IPR2022-00443, dated Apr. 25, 2022, in 27 pages.
Ex. 2020 Declaration of Dr. Brian Pfeifer in Support of Petition for Inter Partes Review of U.S. Pat. No. 10,913,602, *Autostore System Inc. v. Ocado Innovation Limited*, Inter Partes Review No. IPR2022 00443, dated Apr. 25, 2022, in 91 pages.
Decision Denying Institution of Inter Partes Review of U.S. Pat. No. 10,913,602, *Autostore System Inc. v. Ocado Innovation Limited*, Inter Partes Review No. IPR2022-00443, dated Jul. 20, 2022, in 26 pages.
Petition for Inter Partes Review of U.S. Pat. No. 10,961,051, *Autostore System Inc. v. Ocado Innovation Limited*, Inter Partes Review No. IPR2022-00673, dated Mar. 4, 2022, in 99 pages.
Ex. 1003 Declaration of Dr. Stephen Derby, *Autostore System Inc. v. Ocado Innovation Limited*, Inter Partes Review No. IPR2022-00673, dated Mar. 4, 2022, in 103 pages.
Patent Owner Preliminary Response in Reply to Petition for Inter Partes Review of U.S. Pat. No. 10,961,051, *Autostore System Inc. v. Ocado Innovation Limited*, Inter Partes Review No. IPR2022-00673, dated Jun. 16, 2022, in 70 pages.
Ex. 2001 Declaration of Dr. Brian Pfeifer, *Autostore System Inc. v. Ocado Innovation Limited*, Inter Partes Review No. IPR2022-00673, dated Jun. 16, 2022, in 67 pages.
Ex. 2012 Decision Denying Institution of Inter Partes Review of U.S. Pat. No. 10,093,525, *Autostore System Inc. v. Ocado Innovation Limited*, Inter Partes Review No. IPR2022-00673, dated Jun. 16, 2022, in 25 pages.
Decision Granting Institution of Inter Partes Review of U.S. Pat. No. 10,961,051, *Autostore System Inc. v. Ocado Innovation Limited*, Inter Partes Review No. IPR2022-00673, dated Sep. 14, 2022, in 40 pages.
Ex. 1016 Excerpts from Petition for Inter Partes Review of U.S. Pat. No. 10,093,525, *Autostore System Inc. v. Ocado Innovation Limited*, Inter Partes Review No. IPR2022-00673, dated Oct. 12, 2022, in 5 pages.
Ex. 1018 Declaration of Dr. Jason Janét, *Autostore System Inc. v. Ocado Innovation Limited*, Inter Partes Review No. IPR2022-00673, dated Oct. 12, 2022, in 5 pages.
Ex. 2015 Second Declaration of Dr. Brian Pfeifer, *Autostore System Inc. v. Ocado Innovation Limited*, Inter Partes Review No. IPR2022-00673, dated Jan. 23, 2023, in 84 pages.
Ex. 2016 Transcript of Deposition of Dr. Jason Janét, *Autostore System Inc. v. Ocado Innovation Limited*, Inter Partes Review No. IPR2022-00673, dated Jan. 23, 2023, in 207 pages.
Patent Owner Response, *Autostore System Inc. v. Ocado Innovation Limited*, Inter Partes Review No. IPR2022-00673, dated Jan. 23, 2023, in 71 pages.
Ex. 2025 Third Declaration of Dr. Brian Pfeifer in Support of Motion to Amend, *Autostore System Inc. v. Ocado Innovation Limited*, Inter Partes Review No. IPR2022-00673, dated Jan. 23, 2023, in 17 pages.
Patent Owner Non-Contingent Motion to Amend, *Autostore System Inc. v. Ocado Innovation Limited*, Inter Partes Review No. IPR2022-00673, dated Jan. 23, 2023, in 59 pages.
Ex. 1020 Transcript of Deposition of Dr. Brian Pfeifer, *Autostore System Inc. v. Ocado Innovation Limited*, Inter Partes Review No. IPR2022-00673, dated Mar. 9, 2023, in 52 pages.
Ex. 1023 Second Declaration of Dr. Jason Janét, *Autostore System Inc. v. Ocado Innovation Limited*, Inter Partes Review No. IPR2022-00673, dated Mar. 15, 2023, in 21 pages.
Reply to Patent Owner's Response, *Autostore System Inc. v. Ocado Innovation Limited*, Inter Partes Review No. IPR2022-00673, dated Mar. 15, 2023, in 38 pages.
Petitioner's Opposition to Patent Owner's Motion to Amend, *Autostore System Inc. v. Ocado Innovation Limited*, Inter Partes Review No. IPR2022-00673, dated Mar. 15, 2023, in 36 pages.
Preliminary Guidance from Board on Patent Owner's Motion to Amend, *Autostore System Inc. v. Ocado Innovation Limited*, Inter Partes Review No. IPR2022-00673, dated Apr. 12, 2023, in 17 pages.
Pan et al., "Motion Planning for Mobile Robots in a Dynamic Environment with Moving Obstacles," IEEE Int'l Conf. on Robotics & Automation, dated 1990, in 6 pages.
Bennewitz et al., "Optimizing Schedules for Prioritized Path Planning of Multi-Robot Systems," IEEE Int'l Conf. on Robotics & Automation, May 21-26, 2001, in 6 pages.
Patent Owner's Sur-Reply, *Autostore System Inc. v. Ocado Innovation Limited*, Inter Partes Review No. IPR2022-00673, dated Apr. 26, 2023, in 37 pages.
Ex. 2028 Transcript of Deposition of Dr. Jason Janét, *Autostore System Inc. v. Ocado Innovation Limited*, Inter Partes Review No. IPR2022-00673, dated Apr. 7, 2023, in 177 pages.
Ex. 2029 Declaration of Dr. Brian Pfeifer in Support of Motion to Amend, *Autostore System Inc. v. Ocado Innovation Limited*, Inter Partes Review No. IPR2022-00673, dated Apr. 26, 2023, in 13 pages.
Patent Owner's Reply in Support of Motion to Amend, *Autostore System Inc. v. Ocado Innovation Limited*, Inter Partes Review No. IPR2022-00673, dated Apr. 26, 2023, in 34 pages.
Patentee Grounds of Appeal in Appeal of Decision in Opposition to European Patent No. 3299316, dated Apr. 28, 2023, in 37 pages.
Petitioner's Sur-Reply to Patent Owner's Motion to Amend, *Autostore System Inc. v. Ocado Innovation Limited*, Inter Partes Review No. IPR2022-00673, dated May 24, 2023, in 33 pages.
Patent Owner's Motion to Exclude, *Autostore System Inc. v. Ocado Innovation Limited*, Inter Partes Review No. IPR2022-00673, dated May 24, 2023, in 21 pages.
Petitioner's Opposition to Patent Owner's Motion to Exclude, *Autostore System Inc. v. Ocado Innovation Limited*, Inter Partes Review No. IPR2022-00673, dated May 31, 2023, in 25 pages.
Patent Owner's Reply in Support of Its Motion to Exclude, *Autostore System Inc. v. Ocado Innovation Limited*, Inter Partes Review No. IPR2022-00673, dated Jun. 7, 2023, in 13 pages.
Joint Motion to Terminate Proceeding, *Autostore System Inc. v. Ocado Innovation Limited*, Inter Partes Review No. IPR2022-00673, dated Aug. 1, 2023, in 8 pages.
Response to Patent Owner's Reply in Opposition to European Patent No. 3795501, dated Jun. 30, 2023, in 12 pages.
Preliminary Opinion of Opposition Division in Oppositions to European Patent No. 3795501, dated Jul. 13, 2023, in 26 pages.
Stipulation of Dismissal with Prejudice Pursuant to Settlement Agreement, *Ocado Innovation Ltd. and Ocado Solutions Ltd. vs. Autostore AS and Autostore Systems, Inc.*, Case No. 1:21-cv-00041-JL, filed Jul. 26, 2023, in 3 pages.
Decision of Opposition Division Rejecting Opposition to European Patent No. 3119703, Apr. 26, 2023. (30 pages).
Minutes of Oral Proceeding in Opposition to European Patent No. 3119703, Apr. 26, 2023. (3 pages).
International Search Report (PCT/ISA/210) dated Jun. 17, 2015, by the European Patent Office as the International Searching Authority for International Application No. PCT/EP2015/055695.
Written Opinion (PCT/ISA/237) dated Jun. 17, 2015, by the European Patent Office as the International Searching Authority for International Application No. PCT/EP2015/055695.
Opponent Comments on Proprietor Observations on the Preliminary Opinion and the Opponent's letter of Feb. 3, 2022 in Opposition to European Patent No. 3119703, Nov. 17, 2022. (96 pages).
Opponent Comments on Response to Notice of Opposition to European Patent No. 3119703, Nov. 3, 2021. (12 pages).
Opponent Written Submission in Advance of Oral Proceedings in Opposition to European Patent No. 3119703. Nov. 16, 2022. (6 pages).
Opposition to European Patent No. 3119703, dated Jun. 9, 2021. (30 pages).
Preliminary Opinion of Opposition Division in Opposition to European Patent No. 3119703, Mar. 2, 2022.(15 pages).
Proprietor Observations on the Preliminary Opinion and the Opponent's letter of Feb. 3, 2022 in Opposition to European Patent No. 3119703, Jan. 10, 2023. (3 pages).

(56) References Cited

OTHER PUBLICATIONS

Proprietor Response to Notice of Opposition to European Patent No. 3119703, dated Nov. 3, 2021. (67 pages).
"Wheel Slide Protection", Wikipedia, https://web.archive.org/web/20140204220559/https://en.wikipedia.org/wiki/ Wheel_slide_protection, Feb. 2014. (1 page).
Second Opposition to European Patent No. 4101791, dated Oct. 17, 2023, in 14 pages.

* cited by examiner

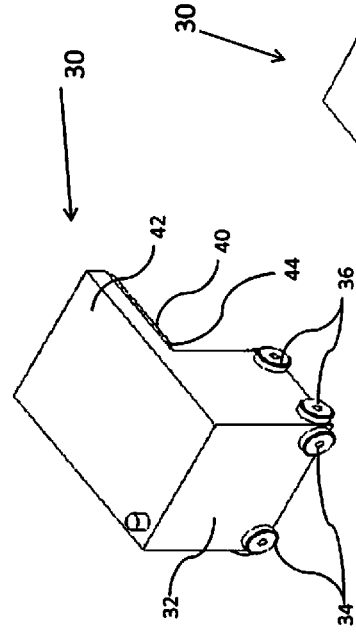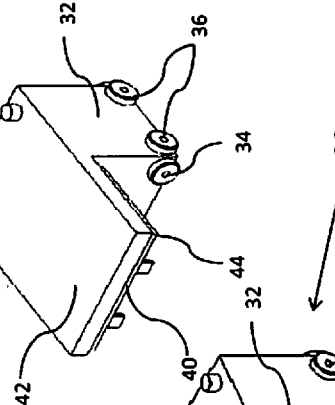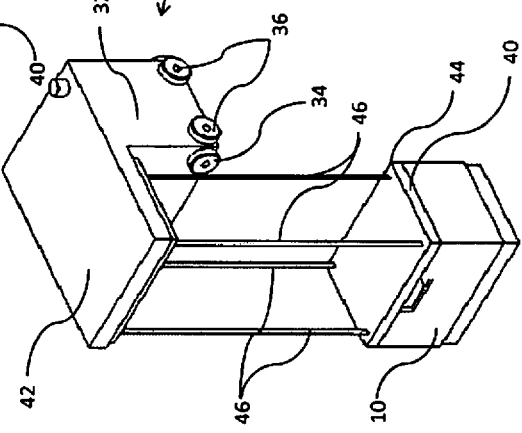

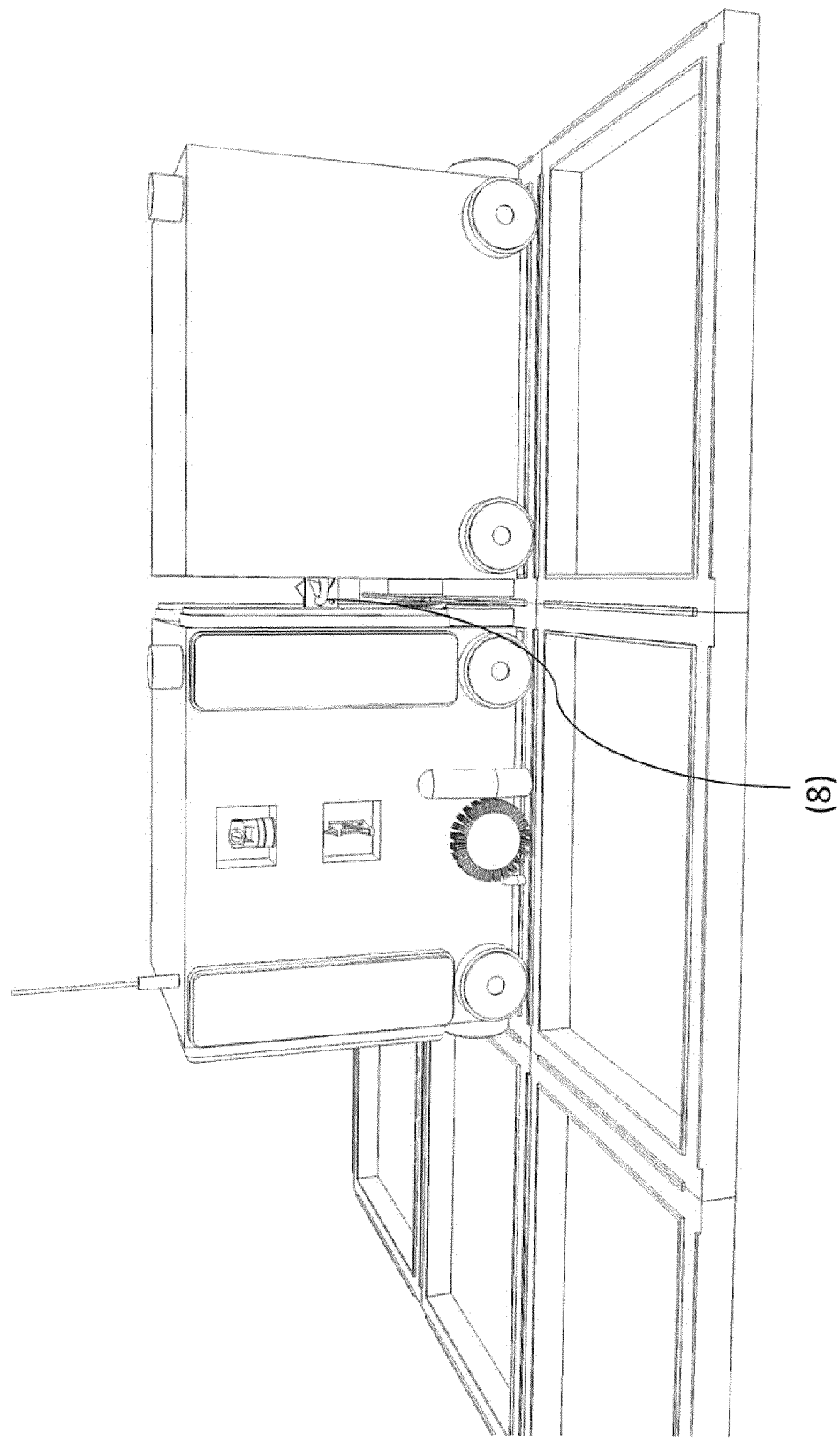

ROBOTIC SERVICE DEVICE AND HANDLING METHOD

CROSS REFERENCE TO RELATED APPLICATIONS

This application is a continuation patent application of U.S. patent application Ser. No. 17/073,788, filed Oct. 19, 2020, which is a continuation patent application of U.S. patent application Ser. No. 15/127,308, filed Sep. 19, 2016, which is a National Stage application of PCT/EP2015/055695, filed Mar. 18, 2015, which claims priority from UK Patent Application no. GB1404870.6 filed on 18 Mar. 2014 the contents of which is hereby incorporated by reference.

FIELD OF THE INVENTION

The present invention relates to a robotic picking system device and method. More specifically but not exclusively, it relates to a robotic service device for use in a robotic picking system and a method of improving the reliability of such systems.

BACKGROUND OF THE INVENTION

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No 1314313.6 where each robotic load handler only covers one grid space, thus allowing higher density of load handlers and thus higher throughput of a given size system.

In some implementations of such bin handling systems, there can be a very large number of robotic load handling devices running on a single grid. These load handling devices can experience problems from time to time and require repair or other intervention in order to return to useful service. Furthermore, there may be spillages or a build-up of dirt or dust on the grid which will require cleaning.

It is a disadvantage of the prior art systems described above that in order to rescue a faulty load handling device or in order to clean the grid, a user is required to access the grid on the stack and perform the necessary operations manually to fix or remove the load handling device or to clean the grid.

For these operations to happen safely it is necessary to stop all robotic load handlers on the grid before the user is allowed access. The higher the number of robotic load handlers in use and the larger the grid, the higher the likelihood of faults occurring and an increased consequence of each fault, due to the number of units which have to be stopped.

SUMMARY

According to the invention there is provided a service device for operation on a robotic picking system comprising two substantially perpendicular sets of rails forming a grid and having robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with a releasable latching mechanism, the latching mechanism being operable to releasably dock the service device to any load handling device present on the grid, the latching mechanism additionally being operable to isolate the load handling device from the grid such that the service device assumes control of the load handling device and moves the load handling device to a predetermined position on the grid under the control of the picking system.

According to the invention there is further provided a service device for operation on a robotic picking system comprising two substantially perpendicular sets of rails forming a grid and having robotic load handling devices thereon, the service device comprising a body mounted on two sets of wheels, the first set of wheels being arranged to engage with at least two rails of the first set of rails, the second set of wheels being arranged to engage with at least two rails of the second set of rails, the first set of wheels being independently moveable and driveable with respect to the second set of wheels such that only one set of wheels is engaged with the grid at any one time thereby enabling movement of the service device along the rails to any point on the grid by driving only the set of wheels engaged with the rails, the service device being further provided with a cleaning mechanism comprising means for removing contaminants present on the grid system.

In this way, the present invention overcomes the problems of the prior art and provides a system and method of increasing the reliability and reducing the overall cost of large bin handling systems by the deployment of one or more automated service robots.

The invention will now be described with reference to the accompanying diagrammatic drawings in which

BRIEF DESCRIPTION OF THE DRAWINGS

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 8 is a schematic perspective view of the robotic service device of FIGS. 5 to 7a and 7b, in use, collecting a malfunctioning load handling device;

DETAILED DESCRIPTION

Figure 1:
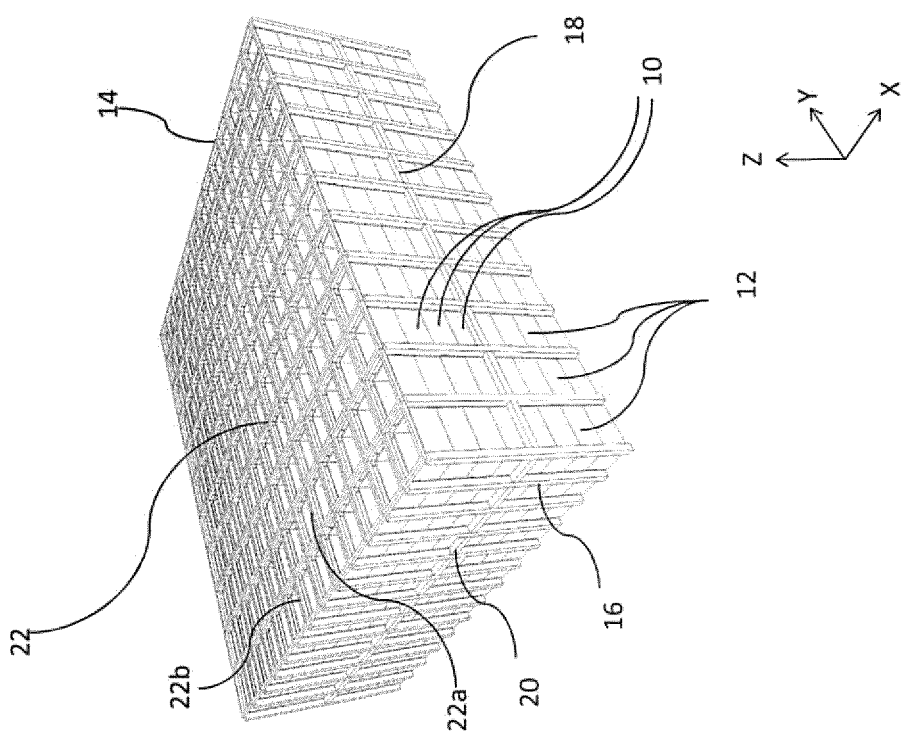
FIG. 1 is a schematic perspective view of a frame structure for housing a plurality of stacks of bins in a known storage system.
Figure 2:
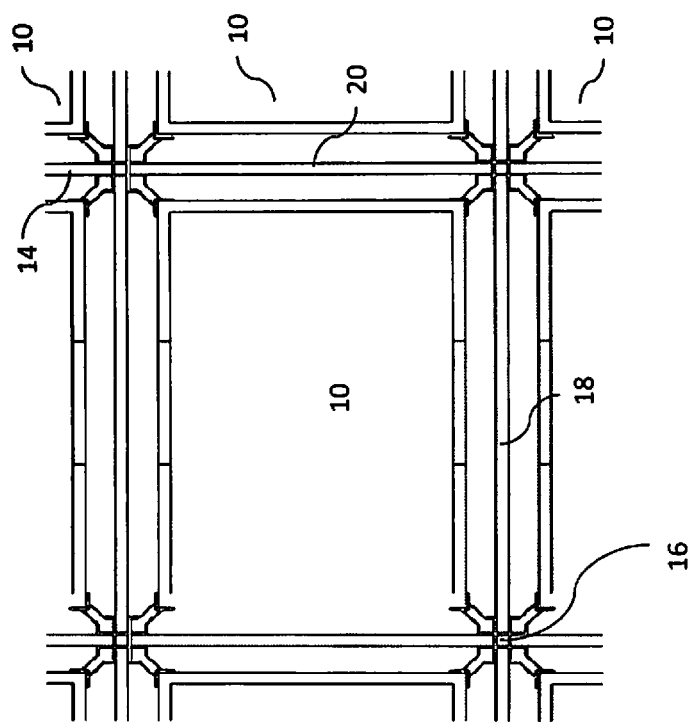
FIG. 2 is a schematic plan view of part of the frame structure of FIG. 1.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 4:
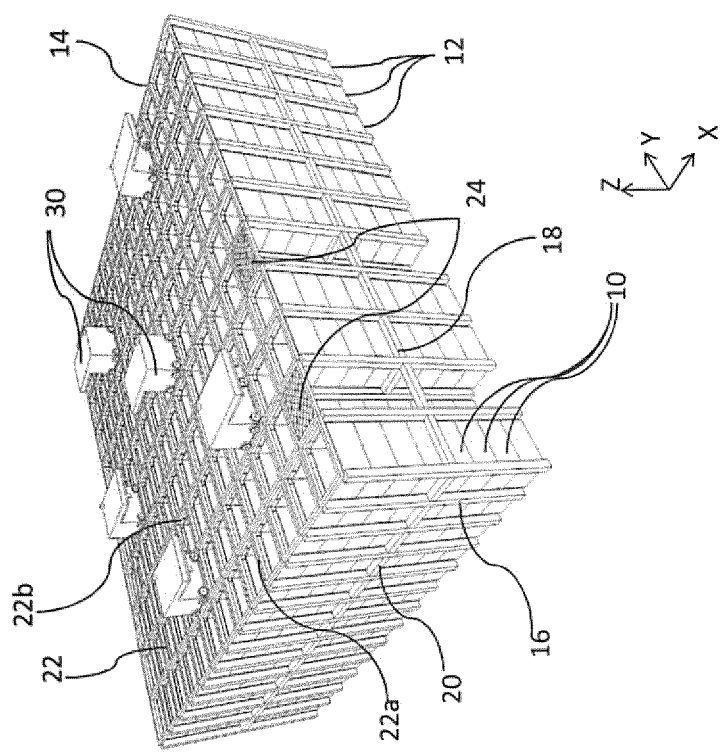
FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12. In addition, a robotic service device is positioned on the grid 14.

It will be appreciated that any form of load handling 30 device may be in use and that the robotic service device may be suitably adapted to interact with any such load handling device 30.

A first form of a second type of robotic service device, will now be described with reference to FIGS. 5 to 7a and 7b.

Figure 5:
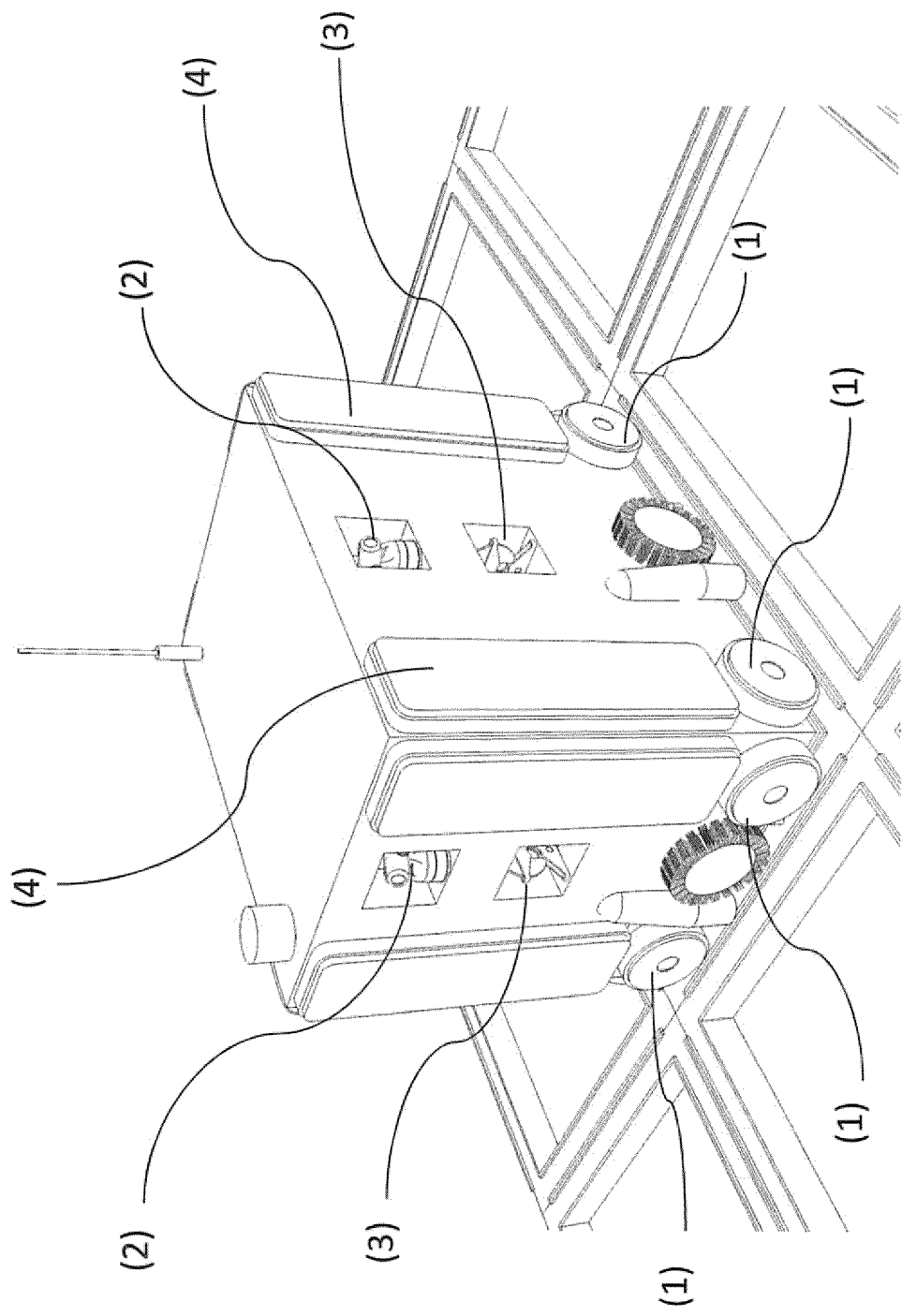
FIG. 5 is a schematic perspective view of a robotic service device according to one embodiment of the present invention.

Referring to FIG. 5, the robotic service device comprises a vehicle 52 having first and second sets of wheels 54, 56 that are engageable with the first and second sets 22a, 22b of rails 22, respectively.

Figure 6:
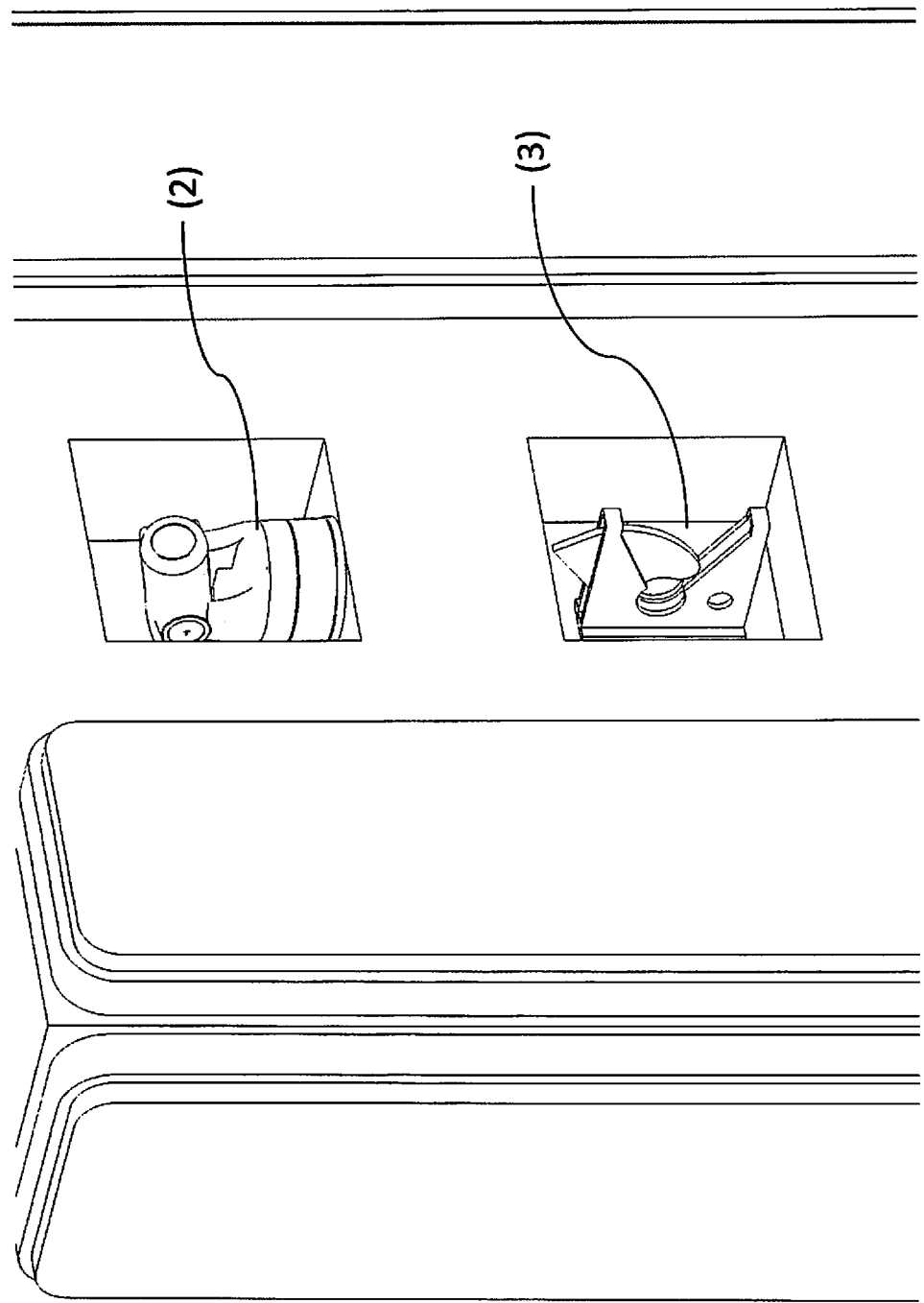
FIG. 6 is a schematic perspective view of part of the service device of FIG. 5, showing a latch mechanism and camera means positioned on the said robotic service device.
Figure 7B:
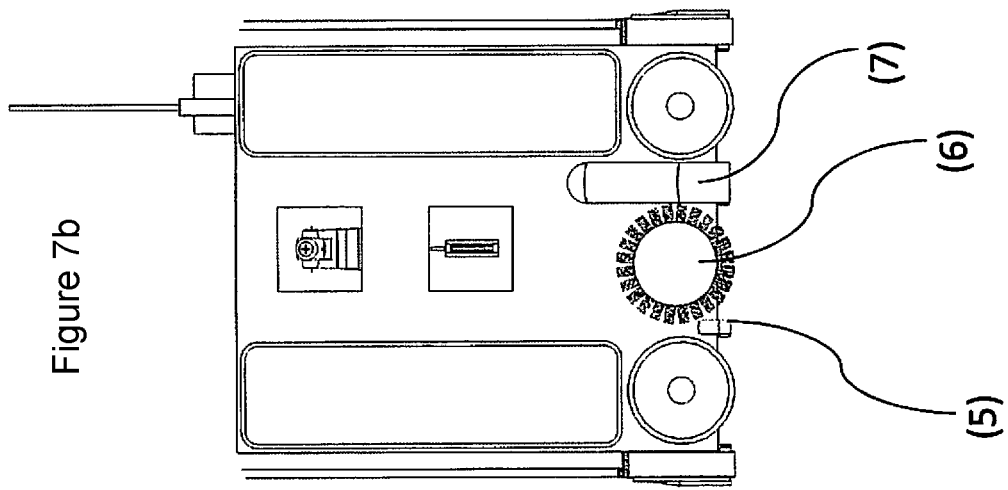
FIGS. 7a and 7b are schematic side views of the robotic service device of FIGS. 5 and 6 showing the wheels, drive system and a cleaning mechanism.
Figure 7A:
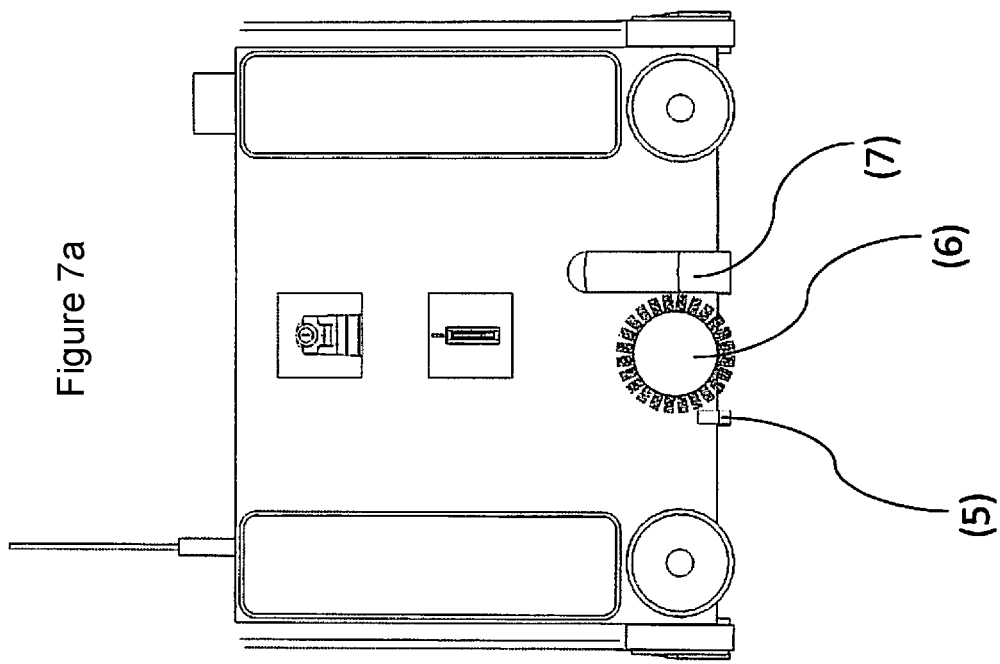
Figure 9:
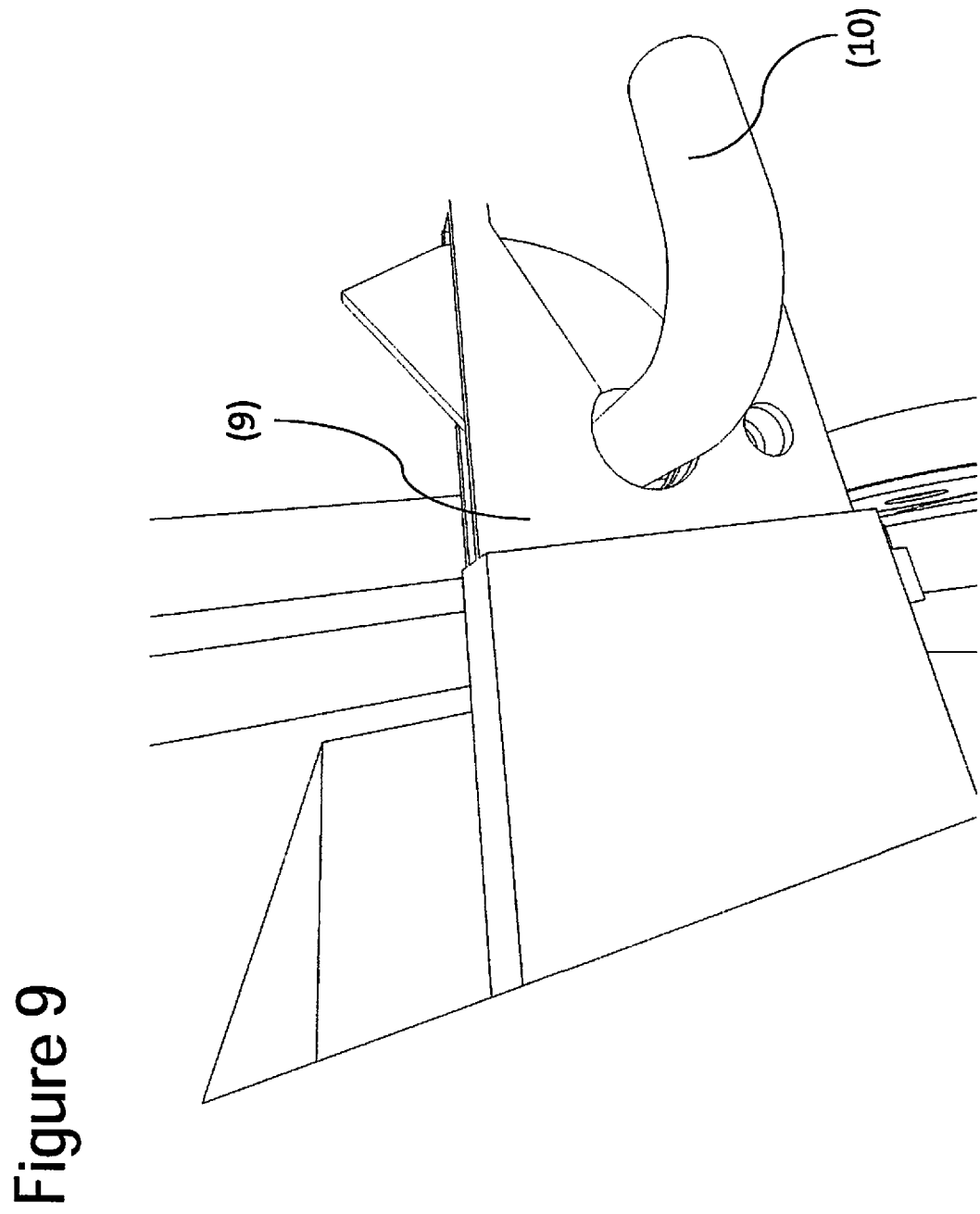
FIG. 9 is an enlarged view of a latching mechanism suitable for latching the malfunctioning load handling device to the robotic service device.

The robotic service device is provided with features additional to those of the robotic load handling device 30. As can be seen in FIGS. 5 and 6, the device is provided with a releasable latching mechanism 3 and camera means 2. Furthermore, the device is provided with cleaning means such as brush mechanisms 6 and a vacuum cleaning system 7 mounted adjacent each set of wheels 1. Moreover, the device includes a spray device 5 capable of discharging suitable detergent under the control of the central picking system (not shown).

In a similar manner to the operation of the load handling device 30, the first and second sets of wheels 1 of the robotic service device can be moved vertically with respect to the vehicle to engage or disengage the wheels 1 from the corresponding set of rails 22a, 22b. By engaging and driving the appropriate set of wheels 1, the robotic service device can be moved in the X and Y directions in the horizontal plane on the top of the frame structure 14.

In the event of a failure or malfunction of a robotic load handling device 30, the robotic service device is moved on the grid 14 to a location adjacent the malfunctioning device 30. Once adjacent to the malfunctioning device 30, the camera means 2 of the service device may be used to view the situation from a control position (not shown). If the load handling device 30 requires removal from the grid 14, then the service device may be releasably latched to the malfunctioning load handling device 30 as shown in FIG. 8. The service device may then be used to manipulate the malfunctioning device 30 to a location where it can be serviced or removed entirely from the grid 14.

It will be appreciated that the form of the releasable latching mechanism 3 need not be as shown in FIGS. 5 to 9 but that any suitable form of releasable latching mechanism may be used. The latching mechanism 3 may connect to a faulty robotic load handler and either lift it clear off the grid, or be able to raise and lower the sets of wheels on the faulty device, so as to be able to push, pull or drag it to a desired location. The latching mechanism 3 may also include a device for causing the faulty unit's gripper mechanism to be retracted from the grid or make any other mechanical or electrical intervention with the robotic load handler 30.

Furthermore, it will be appreciated that the service device may be provided with sensor means instead of or in addition to camera means 2. For example, the service device may be provided with sensors that allow a system operator to remotely diagnose a fault with a faulty or stationary robotic load handler 30. This may include, but not be limited to, electrical connection means to connect to a port of the robotic load handler 30 to check for or diagnose faults via an installed diagnostic system. This may further include sensors such as ultrasonic detectors, x-ray cameras, or sensors for assessing the telecommunications functions within the load handling device 30.

Moreover, the service device may comprise reset means, in addition to or instead of the sensors discussed above, to enable the service device to reset the robotic load handling device 30. The reset means may comprise mechanical means such as a remotely operated manipulator device or it may comprise remotely operable electrical reset means. The mechanical manipulator may further be remotely operable to push the load handling device 30 should the diagnosis suggest the load handling device 30 is simply temporarily stuck on a portion of the grid. Alternatively, the mechanical device may act in conjunction with the service device to push the load handling device to an alternative portion of the grid or off the grid completely.

In another use of the robotic service device, the device is used to travel over the grid 14 to establish the condition of the grid 14. For example, over time spillages and dirt may build up on the grid 14. The service device may be provided with a traction measurement system whereby, for example, one or more wheels 1 are driven whilst one or more wheels 1 are braked, in order to establish if there is a spillage and hence loss of traction for the robotic load handlers 30 on the grid 14. The service device may then be deployed on the grid 14 and the camera means 2 used to remotely view the condition of the grid 14. The brush mechanisms 6, the spray detergent 5 and the vacuum system 7 may then be used as appropriate to clean the grid 14.

Spillage of products such as oil onto the grid, which makes the grid slippery, may be detected by ordinary robotic load handlers using slip detection on the wheels. It is then important to deal with the issue immediately to prevent oil to be spread over large portions of the grid. The proposed method would use several aspects of the robotic service to deal with the issue. In use, any robotic device experiencing slippage would be stopped. Other robotic devices within a predetermined radius of the potential spillage would also be stopped. The picking control system may be used to block all potentially affected areas of the grid in software such that no other robotic devices 30 may access the affected area. One or more robotic service devices may then be deployed initially to clean the area around the now stationary robotic devices. The drive mechanism of the deployed service device may then be used to measure traction, to ensure any spillage is properly removed. The robotic service device may then be used to pick up and remove the affected robotic load handling device 30 to a maintenance area, such that the wheels may be cleaned. Further robotic service devices may be deployed to finish cleaning the affected area until there is sufficient traction on all parts of the grid.

Furthermore, the robotic service device may be provided with means for assessing the mechanical condition of the tracks and the grid. For example, the service device may use sensor or camera means 2 described above to assess the condition of the grid in addition to or separately from assessing the condition of robotic load handling devices 30. For example, the robotic service device may be deployed on to the grid during a housekeeping phase to ensure the stability and integrity of the tracks and grid.

Figure 10:
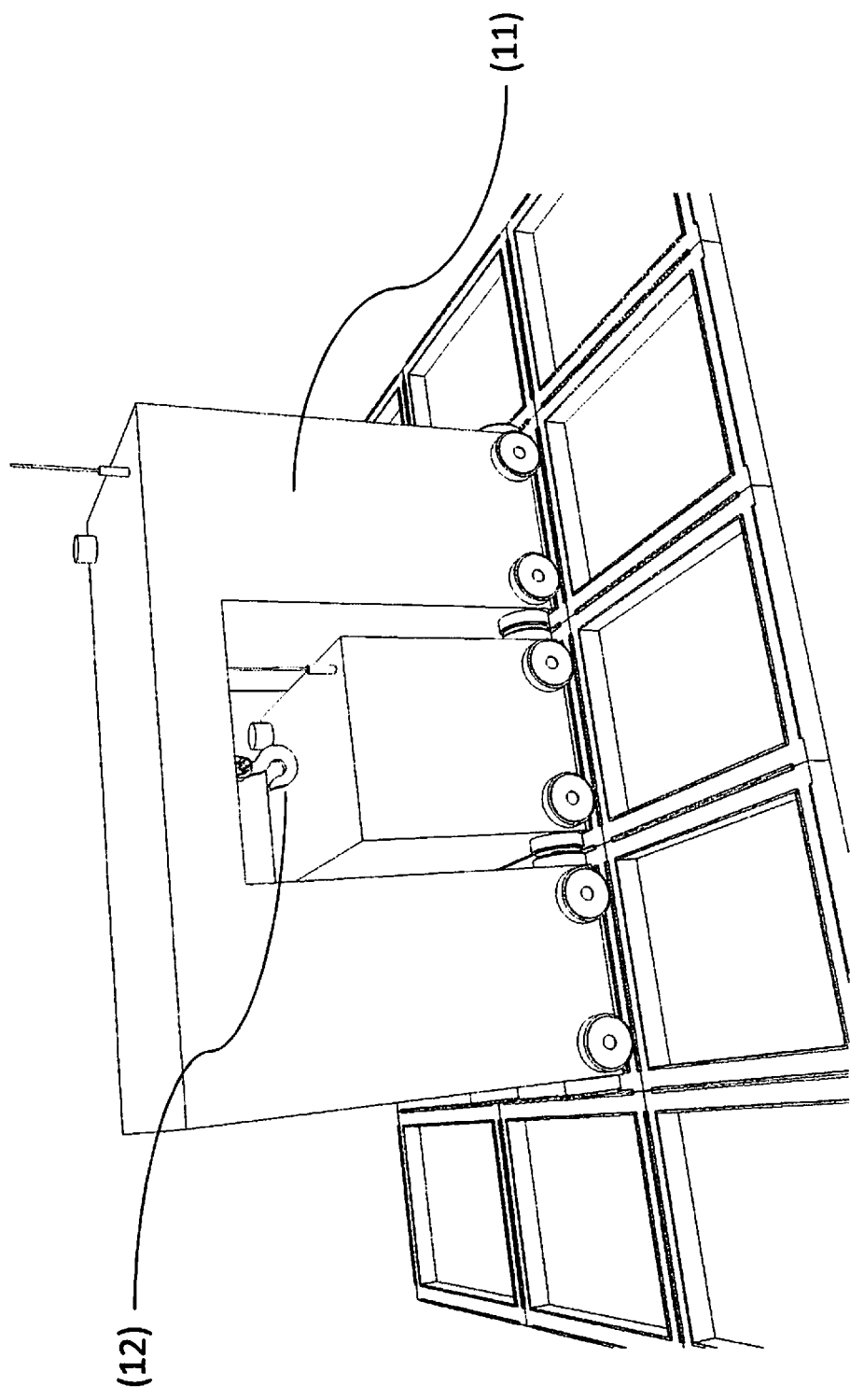
FIG. 10 is a schematic perspective view of a robotic service device according to a second embodiment of the invention, the service device being substantially bridge-shaped.
Figure 11:
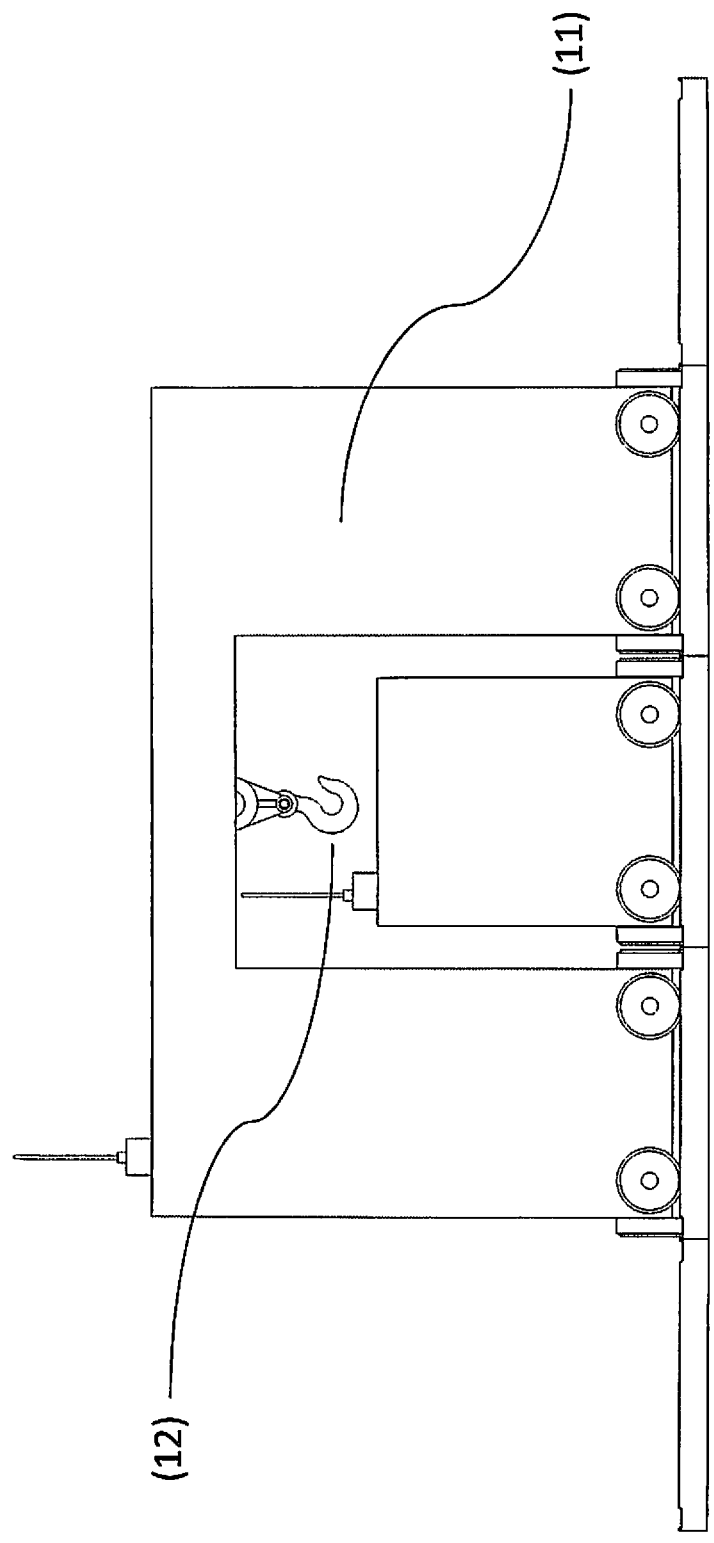
FIG. 11 is a schematic side view of the robotic service device of FIG. 10 in accordance with a second embodiment of the invention, showing the service device in situ over a malfunctioning load handling device.

It will be appreciated that the service device may comprise all, one or any combination of the features described above and that it is not essential to the invention for the service device to include all the sensors and features described. FIGS. 10 and 11 show a second embodiment of the invention. Features similar to that described with reference to the first embodiment will be referenced with the same reference numbers.

FIG. 10 shows an alternative form of robotic service device. The robotic service device comprises a substantially bridge shaped vehicle 11. Referring to FIGS. 10 and 11, the robotic service device comprises a vehicle 11 having first and second sets of wheels that are engageable with the first and second sets of rails 22a, 22b of rails 22, respectively. The bridge-shaped vehicle 11 is sized so as to be capable of straddling a load handling device 30. The service device is provided with a releasable latching or hook mechanism 12 deployable from the underside of the bridge portion.

In use, the first and second sets of wheels 1 of the robotic service device can be moved vertically with respect to the vehicle 11 to engage or disengage the wheels 1 from the corresponding set of rails 22a, 22b. By engaging and driving the appropriate set of wheels 1, the robotic service device can be moved in the X and Y directions in the horizontal plane on the top of the frame structure 14.

In this manner, the service device may be deployed on the grid 14 and driven to a point whereby it straddles a malfunctioning load handling device 30 such that the latching or hook mechanism 12 may be used to lift the malfunctioning device 30 from the grid 14. The picking control system may then be used to move the service device to a position on the grid 14 where the malfunctioning load handling device 30 may be removed as necessary. It will be appreciated that, although not shown in the drawings, the service device of the second embodiment may also have the features described with reference to the first embodiment, including but not limited to brush mechanisms 6, vacuum systems 7, spray systems 5, traction measurement systems and camera means 60, all operational in a similar manner to that described above.

Figure 12:
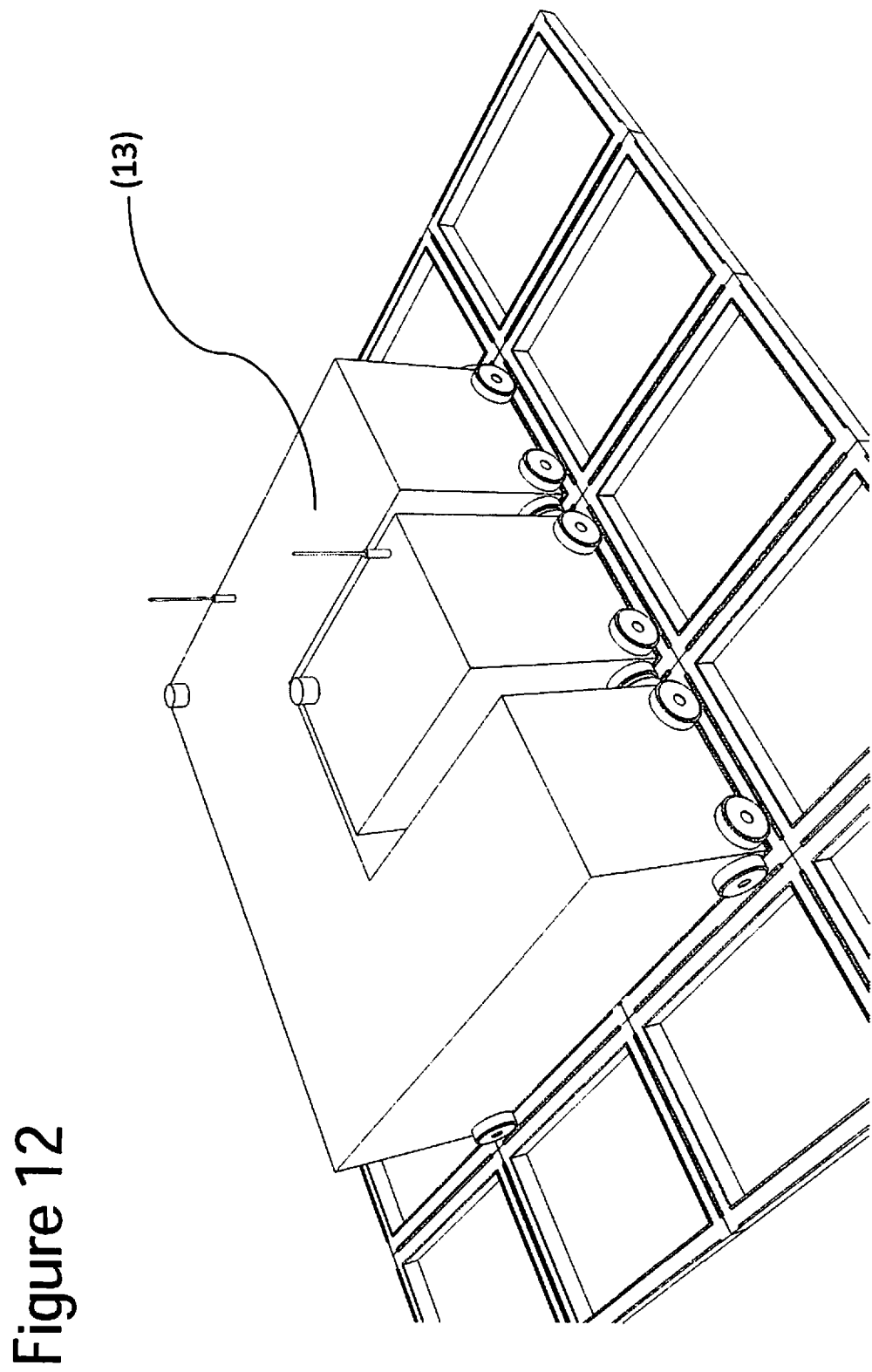
FIG. 12 is a schematic perspective view of a robotic service device according to a third embodiment of the invention, the service device being substantially u-shaped.

FIG. 12 shows a third embodiment of the invention. Features similar to that described with reference to the first and second embodiments of the invention will be referenced with the same reference numbers.

Referring to FIG. 12, the robotic service device comprises a vehicle 13 having first and second sets of wheels 1 that are engageable with the first and second sets 22a, 22b of rails 22, of the grid 14 respectively. The u-shaped vehicle 13 is sized so as to be capable of enclosing a load handling device 30. The service device is provided with a releasable latching or hook mechanism deployable from within the u-shaped portion 13.

In use, the first and second sets of wheels 1 of the robotic service device can be moved vertically with respect to the vehicle 13 to engage or disengage the wheels 1 from the corresponding set of rails 22a, 22b. By engaging and driving the appropriate set of wheels 1, the robotic service device can be moved in the X and Y directions in the horizontal plane on the top of the grid 14.

In this manner, the service device may be deployed on the grid 14 and driven to a point whereby it encloses a malfunctioning load handling device 30 such that the latching or hook mechanism may be used to pull, push or otherwise manipulate the malfunctioning device 30. The picking control system may then be used to move the service device to a position on the grid 14 where the malfunctioning load handling device 30 may be removed as necessary. It will be appreciated that, although not shown in the drawings, the service device of the third embodiment may also have the features described with reference to the first and second embodiments, including but not limited to brush mechanisms 6, vacuum systems 7, spray systems 5, traction measurement systems and camera means 60, all operational in a similar manner to that described above.

It will be appreciated that the latching device need not take the form of a hook but that any suitable latching means may be used. For example the latching means may be magnetic or electro-magnetic. Furthermore, the latching means may be positioned at any point on the service device, indeed a plurality of latching mechanisms may be employed on all sides of the service device such that a load handling device may be approached and latched from any direction on the grid.

Moreover, the latching mechanism of the service device may interact with the load handling device in any way suitable to remove the load handling device from the grid.

There may be electronic communication or mechanical interaction between the service device and the load handling device of any form in order to release the load handling device from the grid.

Figure 13:
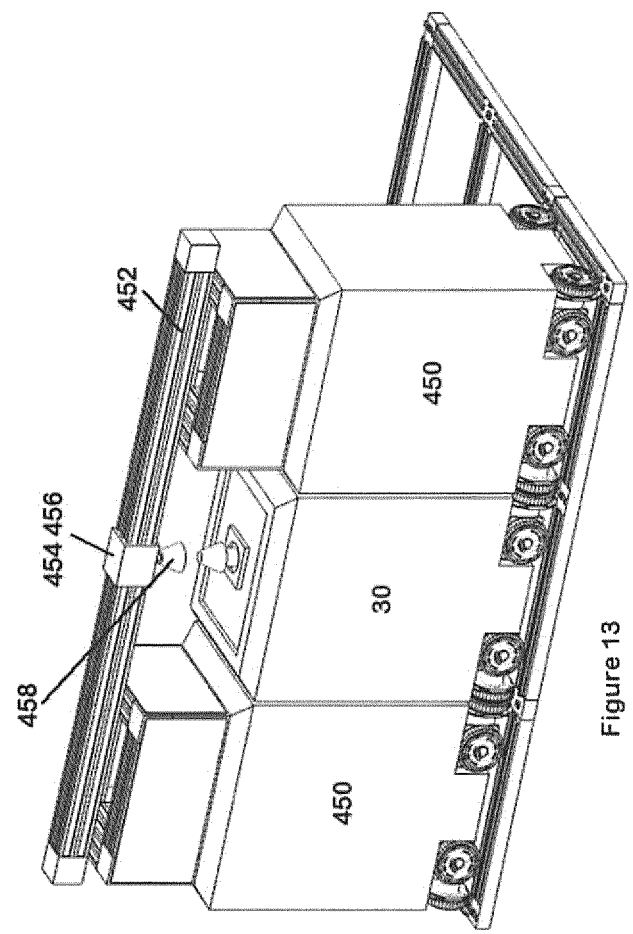
FIG. 13 is a schematic perspective view of a robotic service device according to a fourth embodiment of the invention, a plurality of service devices operating so as to engage a malfunctioning service device to move it or remove it from the grid.
Figure 14:
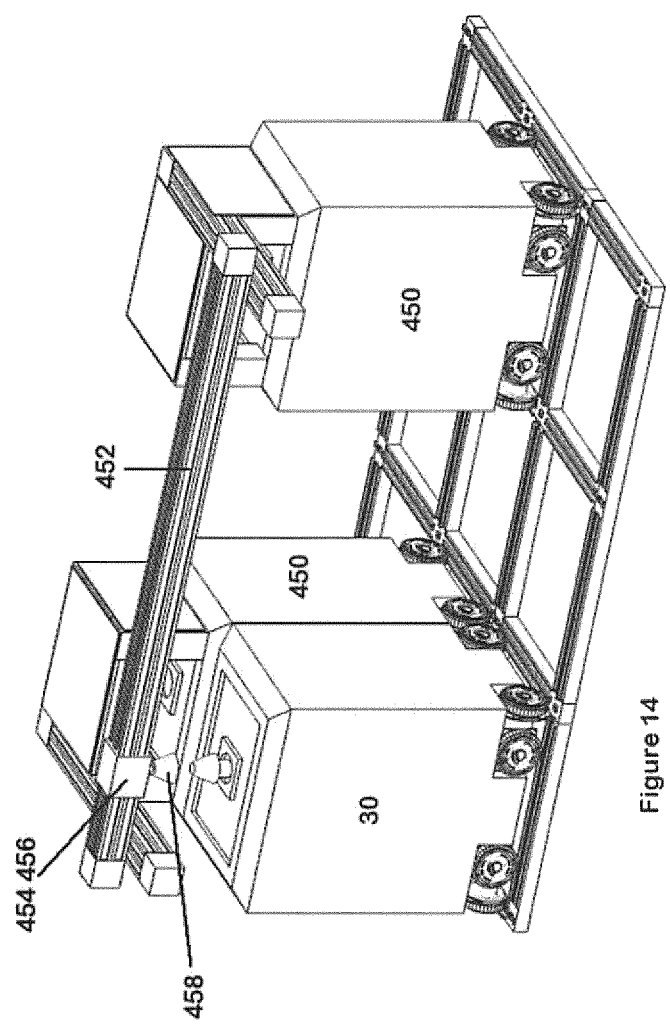
FIG. 14 is a schematic perspective drawing of a robotic service device in accordance with the fourth embodiment of the invention, showing a different configuration of the plurality of service devices.
Figure 15:
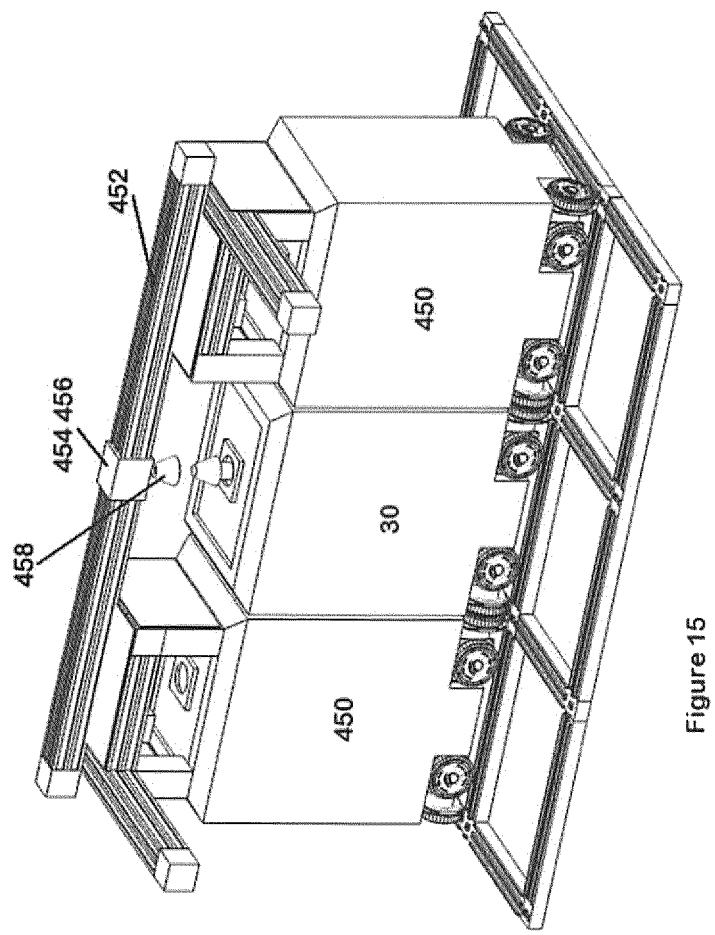
FIG. 15 is a schematic perspective drawing of a robotic service device in accordance with the fourth embodiment of the invention, showing a further configuration of the plurality of service devices.

FIGS. 13 to 15 show a further embodiment of the robotic service device. Features similar to that described with reference to previous embodiments of the invention will be referenced with the same numerals.

In FIG. 13, a pair of robotic service devices 450 are shown connected by a suitable member 452. The member 452 allows the separate robotic service devices 450 to act as a single unit. The member 452 is further provided with connecting, latching and lifting means 454, 456.

The connected robotic service devices 450 are remotely manoeuvred into position such that they occupy grid spaces adjacent an inoperable load handling device 30. From this position the latching means 454 can be lowered or adjusted to connect with a co-operating latching point 456 on the robotic load handling device 30. Once connected, the lifting means 456 is operated to lift the inoperable load handling device 30 clear of the grid and tracks. Once lifted clear, the connected robotic service devices 450 can be remotely instructed to move to a position off the grid to enable recovery of the robotic load handling device.

FIGS. 14 and 15 show alternative configurations for the connected robotic service devices 450 and alternative positions of the member 452 and the connecting latching and lifting means 454, 456.

It will be appreciated that in this embodiment of the invention, it is possible to approach and lift robotic load handling devices from any part of the grid, including the very corners or edges or adjacent supporting structures as the robotic service device 450 connects to the load handling device 30 at a top mounted coupling.

It will be appreciated that the configurations shown in FIGS. 13 to 15 are just a selection of a number of possible configurations and that the invention of the fourth embodiment is not limited to simply these configurations. The connecting, latching and lifting mechanism may be a single mechanism or three separate mechanisms. The connecting and latching mechanisms may comprise mechanical, magnetic or electro-magnetic means or any other suitable means. The lifting means may comprise winch means 458 or any other suitable lifting means.

Figure 16:
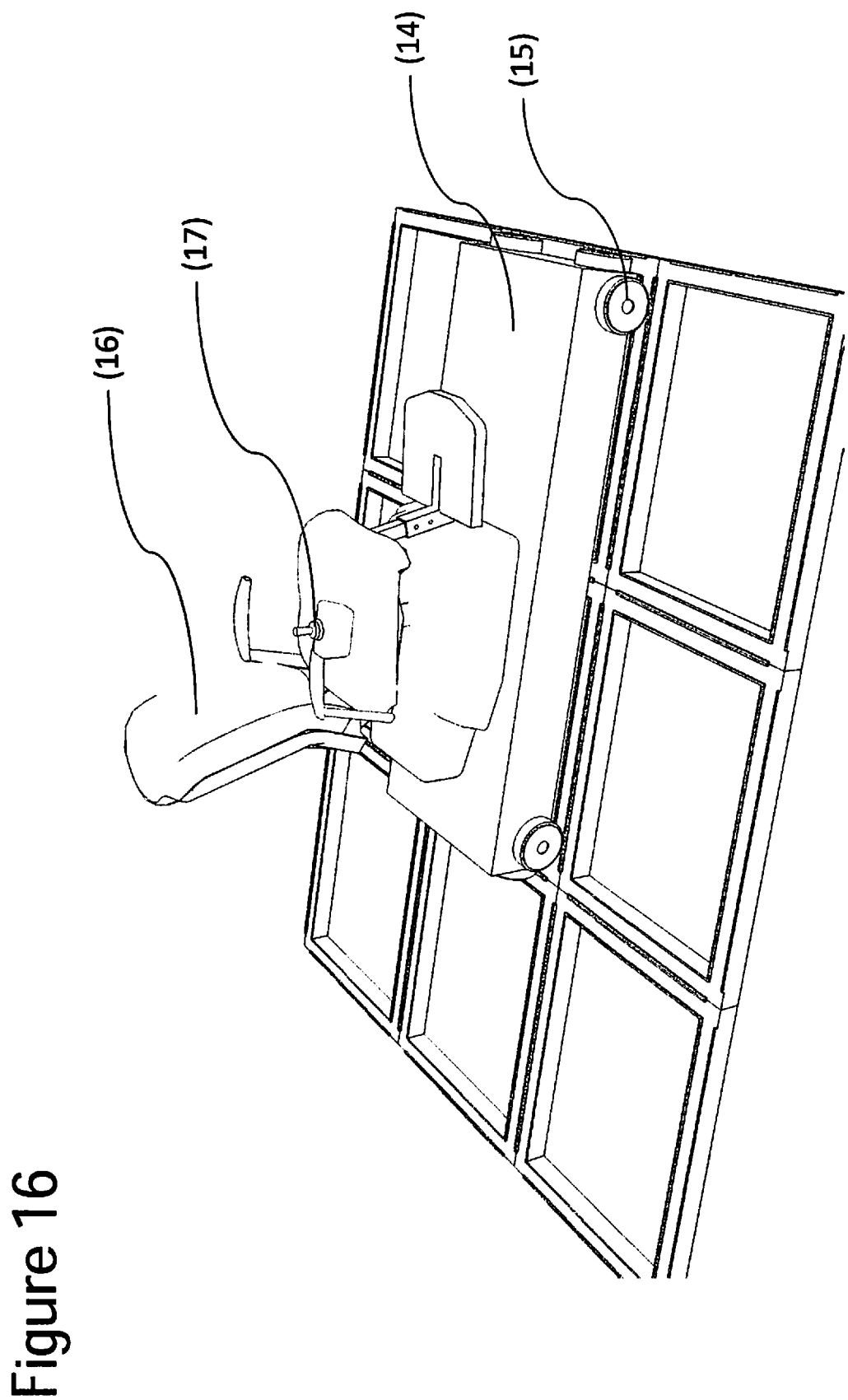
FIG. 16 is a schematic perspective view of a robotic service device according to a fifth embodiment of the invention, in which the service device is provided with a seat to enable carriage of a passenger or user.

FIG. 16 shows a fifth embodiment of the invention. Features similar to that described with reference to the first, second and third embodiments of the invention will be referenced with the same reference numbers.

Referring to FIG. 16, the service device comprises a substantially planar vehicle having first and second sets of wheels 1 that are engageable with the first and second sets 22a, 22b of rails 22, of the grid 14 respectively. The planar vehicle is provided with seating means 17 so as to be capable of carrying a user. The service device may be robotically controlled by the picking system control but may also be manually driven by the user (not shown).

In use, the first and second sets of wheels 1 of the service device can be moved vertically with respect to the vehicle to engage or disengage the wheels 1 from the corresponding set of rails 22a, 22b. By engaging and driving the appropriate set of wheels 1, the service device can be moved in the X and Y directions in the horizontal plane on the top of the grid 14.

In this manner, the service device may be deployed on the grid 14 and driven to a predetermined point on the grid where inspection or maintenance is required.

It will be appreciated that, although not shown in the drawings, the service device of the fifth embodiment may also have the features described with reference to the first, second third and fourth embodiments, including but not limited to brush mechanisms 6, vacuum systems 7, spray systems 5, traction measurement systems and camera means 60, all operational in a similar manner to that described above.

In this manner, the integrity of a large robotically controlled picking system can be maintained and cleaned without the requirement of stopping the whole system to retrieve malfunctioning load handling devices or to clean spillages on the grid. In systems of significant size this can represent a substantial decrease in the down time of the system.

Furthermore, it is possible for the robotic service device described in all or any of the embodiments above to be adapted to carry equipment such as barriers (not shown). The remotely operable mechanical manipulating means may position barriers around a portion of the grid for example, for safety reasons should an operator need to be present on the grid.

It will be appreciated that robotic service devices as described above may contain one or all of the features described. For example, a service device may be capable of lifting a malfunctioning load handling device off the grid and removing it to a maintenance location on the grid, whilst also comprising traction monitoring means and cleaning devices. Furthermore, a ride-on service device may also be provided with the means to pull a malfunctioning load handling device off the grid.

Furthermore, the robotic service device may comprise a load carrying portion, similar to the load handling device, the load carrying portion being adapted to carry maintenance and cleaning equipment such as that described above. Moreover, the load carrying portion may be interchangeable such that one service device may be able to perform different functions depending on the load carrying portion provided at any one time.

It will also be appreciated that the robotic load handling devices 30 may be of the cantilever form shown in FIGS. 1 to 4, that occupy two grid spacings or alternatively the robotic load handling devices 30 may be of the form shown in FIGS. 13 to 15 where they occupy only a single grid spacing.

Many variations and modifications not explicitly described above are also possible without departing from the scope of the invention as defined in the appended claims.

What is claimed is:

1. A grid frame for a storage system, the grid frame comprising:
    a top level comprising:
        a plurality of X-direction rails configured to engage a first pair of wheels and a second pair of wheels of a first load handling device to guide movement of the first load handling device in an X-direction along the top level, the plurality of X-direction rails comprising a first X-direction rail and a second X-direction rail, the first X-direction rail comprising a first part for travel on by the first pair of wheels and a second part for travel on by a pair of wheels of a second load handling device, the first part and the second part of the first X-direction rail each having a width that is at least a width of one of the first pair of wheels; and
        a plurality of Y-direction rails perpendicular to the plurality of X-direction rails and configured to engage a third pair of wheels and a fourth pair of wheels the first load handling device to guide movement of the first load handling device in a Y-direction perpendicular to the X-direction along the top level, the plurality of Y-direction rails comprising a first Y-direction rail and a second Y-direction rail, the first Y-direction rail comprising a first part for travel on by the third pair of wheels and a second part for travel on by a pair of wheels of a third load handling device, the first part and the second part of the first Y-direction rail each having a width that is at least a width of one of the third pair of wheels; and
    a three-dimensional storage structure configured to store stacks of containers beneath the top level,
    wherein:
        the first X-direction rail, the second X-direction rail, the first Y-direction rail, and the second Y-direction rail define an opening above one of the stacks of containers, the opening being on an opposite side of the first part of the first X-direction rail from the second part of the first X-direction rail and being on an opposite side of the first part of the first Y-direction rail from the second part of the first Y-direction rail,
        the first X-direction rail has a first X-direction lip and a second X-direction lip that extend in the X-direction and protrude from the first X-direction rail on opposite sides of the first X-direction rail, and
        the first Y-direction rail has a first Y-direction lip and a second Y-direction lip that extend in the Y-direction and protrude from the first Y-direction rail on opposite sides of the first Y-direction rail.

2. The grid frame of claim 1, wherein:
    the first X-direction lip is configured to engage the first pair of wheels to guide movement of the first pair of wheels in the X-direction along the first part of the first X-direction rail, the first X-direction lip providing a first space at one end of the first X-direction lip for the third pair of wheels to roll in the Y-direction through the first space past the first X-direction lip, the second X-direction lip is configured to engage the pair of wheels of the second load handling device to guide movement of the pair of wheels of the second load handling device in the X-direction along the second part of the first X-direction rail with the first X-direction lip engaging the first pair of wheels, the first Y-direction lip is configured to engage the third pair of wheels to guide movement of the third pair of wheels in the Y-direction along the first part of the first Y-direction rail, the first Y-direction lip providing a second space at one end of the first Y-direction lip for the first pair of wheels to roll in the X-direction through the second space past the first Y-direction lip, and the second Y-direction lip is configured to engage the pair of wheels of the third load handling device to guide movement of the pair of wheels of the third load handling device in the Y-direction along the second part of the first Y-direction rail with the first Y-direction lip engaging the third pair of wheels.

3. The grid frame of claim 2, wherein the first X-direction lip extends in the X-direction less than a distance in the X-direction between a center of the first Y-direction rail and a center of the second Y-direction rail to provide the first space, and the first Y-direction lip extends in the Y-direction less than a distance in the Y-direction between a center of the first X-direction rail and a center of the second X-direction rail to provide the second space.

4. The grid frame of claim 2, wherein the first Y-direction rail has a third Y-direction lip that extends in the Y-direction, the third Y-direction lip being configured to engage the third pair of wheels to guide movement of the third pair of wheels in the Y-direction along the first part of the first Y-direction rail, the third Y-direction lip providing the second space at one end of the third Y-direction lip for the first pair of wheels to roll in the X-direction through the second space past the third Y-direction lip.

5. The grid frame of claim 4, wherein the first Y-direction rail has a fourth Y-direction lip that extends in the Y-direction, the fourth Y-direction lip being configured to engage the pair of wheels of the third load handling device to guide movement of the pair of wheels of the third load handling device in the Y-direction along the second part of the first Y-direction rail.

6. The grid frame of claim 5, wherein a distance between the one end of the first Y-direction lip and the one end of the third Y-direction lip is the same as a distance between one end of the second Y-direction lip and one end of the fourth Y-direction lip.

7. The grid frame of claim 4, wherein the first Y-direction rail is formed from a single piece of material.

8. The grid frame of claim 1, wherein:
each of the plurality of X-direction rails comprises at least two X-direction lips that protrude from that X-direction rail on opposite sides of that X-direction rail, and
each of the plurality of Y-direction rails comprises at least two Y-direction lips that protrude from that Y-direction rail on opposite sides of that Y-direction rail.

9. The grid frame of claim 8, wherein each of the plurality of Y-direction rails comprises at least four Y-direction lips that protrude from that Y-direction rail such that at least two Y-direction lips are on opposite sides of that Y-direction rail.

10. The grid frame of claim 9, wherein the plurality of X-direction rails and the plurality of Y-direction rails are configured to engage the first, second, third, or fourth pair of wheels to guide movement of the first load handling device along an entirety of the top level.

11. The grid frame of claim 1, wherein the first X-direction lip and the second X-direction lip each has a length equal to a width of the opening.

12. The grid frame of claim 11, wherein the first Y-direction lip and the second Y-direction lip each has a length equal to a length of the opening.

13. The grid frame of claim 1, wherein the first X-direction lip and the second X-direction lip each protrudes from the first X-direction rail a first height above the first X-direction rail, and the first height is less than a width of the first X-direction rail in the Y-direction.

14. The grid frame of claim 13, wherein the first Y-direction lip and the second Y-direction lip each protrudes from the first Y-direction rail a second height above the first Y-direction rail, and the second height is less than a width of the first Y-direction rail in the X-direction.

15. The grid frame of claim 14, wherein the first height is equal to the second height.

16. The grid frame of claim 1, wherein the first X-direction lip contacts the first Y-direction lip.

17. The grid frame of claim 1, wherein:
the second X-direction rail has a third X-direction lip and a fourth X-direction lip that extend in the X-direction and protrude from the second X-direction rail on opposite sides of the second X-direction rail, and
the second Y-direction rail has a third Y-direction lip and a fourth Y-direction lip that extend in the Y-direction and protrude from the second Y-direction rail on opposite sides of the second X-direction rail.

18. The grid frame of claim 17, wherein:
the third X-direction lip is configured to engage the second pair of wheels to guide movement of the second pair of wheels in the X-direction along a first part of the second X-direction rail, the third X-direction lip providing a third space at one end of the third X-direction lip for the fourth pair of wheels to roll in the Y-direction through the third space past the third X-direction lip,
the fourth X-direction lip is configured to engage a pair of wheels of a fourth load handling device to guide movement of the pair of wheels of the fourth load handling device in the X-direction along a second part of the second X-direction rail different from the first part of the second X-direction rail with the third X-direction lip engaging the second pair of wheels,
the third Y-direction lip is configured to engage the fourth pair of wheels to guide movement of the fourth pair of wheels in the Y-direction along a first part of the second Y-direction rail, the third Y-direction lip providing a fourth space at one end of the third Y-direction lip for the second pair of wheels to roll in the X-direction through the fourth space past the third Y-direction lip, and
the fourth Y-direction lip is configured to engage a pair of wheels of a fifth load handling device to guide movement of the pair of the fifth load handling device in the Y-direction along a second part of the second Y-direction rail different from the first part of the second Y-direction rail with the third Y-direction lip engaging the fourth pair of wheels.

19. The grid frame of claim 17, wherein:
the first X-direction lip and the third X-direction lip are configured to inhibit translation of the first pair of wheels and the second pair of wheels in the Y-direction, and the first Y-direction lip and the third Y-direction lip are configured to inhibit translation of the third pair of wheels and the fourth pair of wheels in the X-direction.

20. The grid frame of claim 17, wherein the first X-direction lip contacts the first Y-direction lip and the third Y-direction lip, and the third X-direction lip contacts the first Y-direction lip and the third Y-direction lip.

21. The grid frame of claim 1, wherein:
the first X-direction lip is configured to inhibit translation of the first pair of wheels in the Y-direction, and
the first Y-direction lip is configured to inhibit translation of the third pair of wheels in the X-direction.

22. The grid frame of claim 1, wherein:
the first X-direction lip provides a third space at the other end of the first X-direction lip for the fourth pair of wheels to roll in the Y-direction through the third space past the first X-direction lip, and
the first Y-direction lip provides a fourth space at the other end of the first Y-direction lip for the second pair of wheels to roll in the X-direction through the fourth space past the first Y-direction lip.

23. The grid frame of claim 1, wherein the three-dimensional storage structure comprises a plurality of support columns vertically extending to the top level, the plurality of support columns connected to the top level to support the top level above the three-dimensional storage structure.

24. The grid frame of claim 23, further comprising a plurality of rail junctions at intersections of the plurality of X-direction rails and the plurality of Y-direction rails, the plurality of support columns being vertically aligned with at least some of the plurality of rail junctions and configured to store the stacks of containers between the plurality of support columns.

25. The grid frame of claim 23, wherein the plurality of support columns are positioned in a rectangular pattern that define storage columns for storing the stacks of containers in the three-dimensional storage structure.

26. The grid frame of claim 1, further comprising a plurality of rail junctions at intersections of the plurality of X-direction rails and the plurality of Y-direction rails.

27. The grid frame of claim 1, wherein the opening is configured to allow a container from one of the stacks of containers to vertically pass through the opening.

28. The grid frame of claim 1, wherein the opening is opposite another opening relative to the first X-direction rail and is opposite yet another opening relative to the first Y-direction rail, the another opening being above another of the stacks of containers, the yet another opening being above yet another of the stacks of containers.

* * * * *